(12) United States Patent
Claussen et al.

(10) Patent No.: US 9,263,041 B2
(45) Date of Patent: Feb. 16, 2016

(54) CHANNEL DETECTION IN NOISE USING SINGLE CHANNEL DATA

(71) Applicants: Heiko Claussen, Plainsboro, NJ (US); Justinian Rosca, West Windsor, NJ (US)

(72) Inventors: Heiko Claussen, Plainsboro, NJ (US); Justinian Rosca, West Windsor, NJ (US)

(73) Assignee: Siemens Aktiengesellschaft, Munich (DE)

(*) Notice: Subject to any disclaimer, the term of this patent is extended or adjusted under 35 U.S.C. 154(b) by 385 days.

(21) Appl. No.: 13/804,947

(22) Filed: Mar. 14, 2013

(65) Prior Publication Data

US 2013/0275128 A1    Oct. 17, 2013

Related U.S. Application Data

(60) Provisional application No. 61/616,561, filed on Mar. 28, 2012.

(51) Int. Cl.
| | |
|---|---|
| *A61F 11/06* | (2006.01) |
| *G10L 15/20* | (2006.01) |
| *G10L 25/78* | (2013.01) |
| *G10L 25/27* | (2013.01) |
| *G10L 17/08* | (2013.01) |

(52) U.S. Cl.
CPC ............... *G10L 15/20* (2013.01); *G10L 25/27* (2013.01); *G10L 25/78* (2013.01); *G10L 17/08* (2013.01)

(58) Field of Classification Search
CPC . H04R 2225/43; H04R 25/43; H04R 2225/41
USPC ....................... 381/313, 317, 71.12
See application file for complete search history.

(56) References Cited

U.S. PATENT DOCUMENTS

| | | | |
|---|---|---|---|
| 7,417,983 B2 * | 8/2008 | He et al. .................. | 370/352 |
| 2008/0152167 A1 * | 6/2008 | Taenzer .................... | 381/94.2 |
| 2010/0316293 A1 * | 12/2010 | Claussen et al. ........... | 382/170 |

* cited by examiner

*Primary Examiner* — Alexander Jamal

(57) ABSTRACT

Methods related to Generalized Mutual Interdependence Analysis (GMIA), a low complexity statistical method for projecting data in a subspace that captures invariant properties of the data, are implemented on a processor based system. GMIA methods are applied to the signal processing problem of voice activity detection and classification. Real-world conversational speech data are modeled to fit the GMIA assumptions. Low complexity GMIA computations extract reliable features for classification of sound under noisy conditions and operate with small amounts of data. A speaker is characterized by a slow varying or invariant channel that is learned and is tracked from single channel data by GMIA methods.

16 Claims, 12 Drawing Sheets

CHANNEL DETECTION IN NOISE USING SINGLE CHANNEL DATA

STATEMENT OF RELATED CASES

The present application claims priority to and the benefit of U.S. Provisional Patent Application Ser. No. 61/616,561 filed on Mar. 28, 2012, which is incorporated herein by reference in its entirety.

TECHNICAL FIELD

The present invention relates to providing a simplified method to capture invariant properties of a data channel. More in particular it relates to analyzing acoustic signals for voice activity detection and classification.

BACKGROUND

Signal detection in continuous or discrete time is a cornerstone problem in signal processing. One particularly well studied instance in speech and acoustic processing is voice detection, which subsumes a solution to the problem of distinguishing the most likely hypothesis between one assuming speech presence and a second assuming the presence of noise. Furthermore, when multiple people are speaking, it is difficult to determine if the captured audio signal is from a speaker of interest or from other people. Speech coding, speech/signal processing in noisy conditions, and speech recognition are important applications where a good voice/signal detection algorithm can substantially increase the performance of the respective system.

Traditionally, voice detection approaches used energy criteria such as short-time SNR estimation based on long-term noise estimation as for instance described in "[22] Srinivasan K, Gersho A (1993) Voice activity detection for cellular networks. In: IEEE Speech Coding Workshop, pp 85-86", likelihood ratio test of the signal and exploiting a statistical model of the signal as described in "Cho Y, Al-Naimi K, Kondoz A (2001) Improved voice activity detection based on a smoothed statistical likelihood ratio. In: International Conference on Acoustics, Speech and Signal Processing, IEEE, Los Alamitos, Calif., vol 2, pp 737-740", or attempted to extract robust features (e.g., the presence of a pitch as described in "[9] ETSI (1999) Digital cellular telecommunication system (phase 2+); voice activity detector VAD for adaptive multi rate (AMR) speech traffic channels; general description. Tech. Rep. V.7.0.0, ETSI", the formant shape as described in "[15] Hoyt J D, Wechsler H (1994) Detection of human speech in structured noise. In: International Conference on Acoustics, Speech and Signal Processing, IEEE, vol 2, pp 237-240", or the cepstrum as described in "[13] Haigh J, Mason J (1993) Robust voice activity detection using cepstral features. In: IEEE Region 10 Conference TENCON, IEEE, vol 3, pp 321-324") and compare them to a speech model. Diffuse, non-stationary noise, with a time-varying spectral coherence, plus the presence of a superposition of spatially localized but simultaneous sources make this problem extremely challenging when using a single sensor (microphone).

Not surprisingly, during the last decade researchers have focused on multi-modality sensing to make this problem tractable. Multiple channel voice detection algorithms take advantage of the extra information provided by additional sensors. For example in "[21] Rosca J, Balan R, Fan N, Beaugeant C, Gilg V (2002) Multichannel voice detection in adverse environments. In: European Signal Processing Conference" the mixing model is blindly identified and a signal is estimated with maximal signal-to-interference-ratio (SIR) obtainable through linear filtering. Although the filtered signal contains large artifacts and is unsuitable for signal estimation it was proven ideal for signal detection. Another example is the WITTY (Who is Talking to You) project from Microsoft as described in "[24] Zhang Z, Liu Z, Sinclair M, Acero A, Deng L, Huang X, Zheng Y (2004) Multisensory microphones for robust speech detection, enhancement and recognition. In: International Conference on Acoustics, Speech and Signal Processing, IEEE, pp 781-784", which deals with the voice detection problem by means of integrated heterogeneous sensors (e.g., a combination of a close-talk microphone and a bone conductive microphone).

Even further, multi-modal systems using both microphones and cameras have been studied as described in "[17] Liu P, Wang Z (2004) Voice activity detection using visual information. In: International Conference on Acoustics, Speech and Signal Processing, Montreal, Canada, vol 1, pp 609-612".

Improved and novel methods and systems to perform voice (or signal) detection for the source of interest with the reliability of multi-modal approaches such as WITTY but in the absence of additional sensors such as a bone conducting microphone are beneficial but are believed to be currently not available and are required.

SUMMARY

In accordance with an aspect of the present invention a method is provided for detecting own voice activity by a speaker using a microphone having a near field channel with the speaker covering a distance of 30 cm or less, comprising a processor extracting a near-field signature from signals generated from a plurality of different voices applied to the near-field channel by using general mutual interdependence analysis (GMIA), the microphone generating a speaker signal from a voice of the speaker, the processor extracting a channel signature from the speaker signal by applying GMIA, the processor comparing the channel signature with the near-field signature to determine a channel used by the speaker.

In accordance with a further aspect of the present invention a method is provided, wherein the channel used by the speaker is the near-field channel or a far-field channel.

In accordance with yet a further aspect of the present invention a method is provided, further comprising: the processor determining that the speaker voice was transmitted over the near-field channel.

In accordance with yet a further aspect of the present invention a method is provided, wherein a signal generated by an additional source is superimposed on the speaker signal and wherein a measure of the speaker signal relative to the signal generated by the additional source is a signal to noise ratio of 20 decibel (dB) or less.

In accordance with yet a further aspect of the present invention a method is provided, further comprising: the processor extracting a far-field channel signature from signals generated from a plurality of different voices applied to a far-field channel covering a distance of more than 30 cm between a voice and the microphone by using general mutual interdependence analysis and the processor determining that the speaker voice was transmitted over the far-field channel.

In accordance with yet a further aspect of the present invention a method is provided, wherein the near-field signature depends on a regularization parameter and is determined by an expression:

$$\text{GMIA}(\lambda) = \zeta X \cdot (X^T \cdot X + \lambda I)^{-1} \cdot \underline{1} \text{ with,}$$

λ the regularization parameter with λ∈[0, ∞),
X is a set of N input vectors of dimension D, wherein N≤D,
T indicates a matrix transposition,
· indicates a matrix multiplication,
ζ is a constant,
I is an identity matrix, and
$\underline{1}$ is a vector of 1 s.

In accordance with yet a further aspect of the present invention a method is provided, wherein λ is selected based on an equal error ratio (EER).

In accordance with yet a further aspect of the present invention a method is provided, wherein the method is used in an integrated hearing aid.

In accordance with another aspect of the present invention a system is provided to determine own voice activity of a speaker using a microphone, comprising: a memory to store data and instructions, including a near-field channel signature extracted from a plurality of different voices applied individually to a near-field channel related to the microphone by using general mutual interdependence analysis (GMIA), the near-filed channel covering a distance of 30 cm or less between the microphone and the speaker, a processor enabled to execute instructions to perform the steps: retrieving the near-field channel signature from the memory, receiving data representing signals generated by the microphone from a voice of the speaker, extracting a speaker based channel signature from the data representing the speaker signal by applying GMIA and comparing the speaker based channel signature with the near-field channel signature to determine a channel used by the speaker.

In accordance with yet another aspect of the present invention a system is provided, wherein the channel used by the speaker is the near-field channel or a far-field channel.

In accordance with yet another aspect of the present invention a system is provided, wherein the processor determines that the speaker used the near-field channel.

In accordance with yet another aspect of the present invention a system is provided, wherein a signal generated by an additional source is superimposed on the speaker signal and wherein a measure of the speaker signal relative to the signal generated by the additional source is a signal to noise ratio of 20 decibel (dB) or less.

In accordance with yet another aspect of the present invention a system is provided, wherein the system is part of an integrated hearing aid.

In accordance with yet another aspect of the present invention a system is provided, wherein the near-field channel depends on a regularization parameter and is determined by an expression:

$$GMIA(\lambda) = \zeta X \cdot (X^T \cdot X + \lambda I)^{-1} \cdot \underline{1} \text{ with,}$$

λ the regularization parameter with λ∈[0, ∞),
X is a set of N input vectors of dimension D, wherein N≤D,
T indicates a matrix transposition,
· indicates a matrix multiplication,
ζ is a constant,
I is an identity matrix, and
$\underline{1}$ is a vector of 1 s.

In accordance with yet another aspect of the present invention a system is provided, wherein λ is selected based on an equal error ratio (EER).

In accordance with yet another aspect of the present invention a system is provided, further comprising: the processor enabled to perform the steps: extracting a far-field channel signature from signals generated from a plurality of different voices applied to a far-field channel covering a distance of more than 30 cm between a voice and the microphone by using general mutual interdependence analysis and the processor determining that the speaker voice was transmitted over the far-field channel.

In accordance with a further aspect of the present invention a method is provided for detecting own voice activity by a speaker using a microphone having a near field channel with the speaker covering a distance of 30 cm or less, comprising a processor extracting a speaker invariant near-field signature from signals generated from a plurality of different voices applied to the near-field channel, the microphone generating a speaker signal from a voice of the speaker, the processor extracting a channel signature from the speaker signal and the processor comparing the channel signature with the near-field signature to determine a channel used by the speaker.

In accordance with yet another aspect of the present invention a system is provided, wherein the speaker invariant near-field signature is determined by general mutual interdependence analysis.

In accordance with yet another aspect of the present invention a system is provided, wherein the speaker invariant near-field signature is determined by mel frequency cepstral coefficients analysis.

In accordance with yet another aspect of the present invention a system is provided, wherein the speaker invariant near-field signature is determined by cepstral-mean analysis.

DRAWINGS

DESCRIPTION

Figure 1:
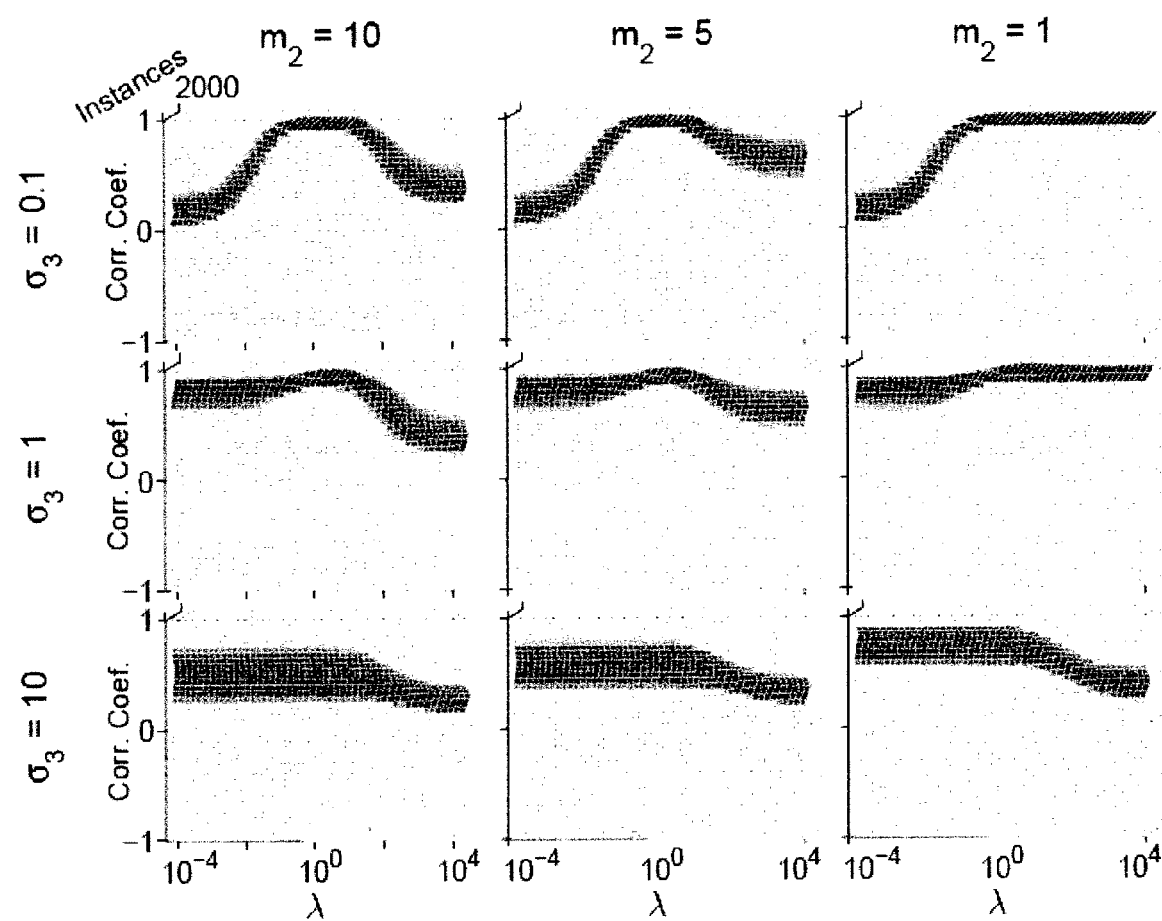
FIG. 1 illustrates a performance of an application of general mutual interdependence analysis (GMIA) in accordance with at least one aspect of the present invention.

In accordance with an aspect of the present invention a simplified statistical data representation is computed that retains invariant information that is necessary for subsequent tasks such as classification or prediction. Methods such as Fisher's linear discriminant analysis (FLDA) as described in "[10] Fisher R A (1936) The use of multiple measurements in taxonomic problems. Annals of Eugenics 7:179-188", canonical correlation analysis (CCA) as described in "[14] Hotelling H (1936) Relation between two sets of variates. Biometrika 28:322-377" or ridge regression as described in "[23] Tikhonov A (1943) On the stability of inverse problems. Doklady Akademii Nauk SSSR 39(5):195-198" extract 'optimal' representations of a dataset.

For instance, FLDA defines a projection space that maximizes the ratio of the between- and within-class scatter of the training data to reduce the dimensionality of the input. CCA assumes one common source in two datasets. The dimensionality of the data is reduced by retaining the space that is spanned by pairs of projecting directions in which the datasets are maximally correlated. In contrast, ridge regression finds a linear combination of the inputs that best fits a desired response.

In accordance with an aspect of the present invention an alternative second order statistical criterion is considered to find an 'optimal' dataset representation, called generalized mutual interdependence analysis abbreviated herein and designated as GMIA. In accordance with an aspect of the present invention an invariant computation or feature of high dimensional instances of a single class is defined which does not change within its class, where the number of input instances N is smaller than their dimensionality D.

In accordance with an aspect of the present invention an application of GMIA to the system identification problem of an acoustical channel is provided as follows. Multiple people (representing the multiple inputs of a linear acoustic system) could be engaged in conversational speech. Audio could be captured using multiple microphones, which are the system outputs available for identification of the linear time invariant system representing the channels. Each transfer function input to output can be modeled as an FIR filter, and the system can be modeled as a MIMO FIR acoustic system. Such a scenario, encountered not just in acoustics but also in communications and other areas is conventionally addressed by blind source separation (for source estimation) and blind channel identification techniques (for channel identification).

In accordance with an aspect of the present invention one sensor only is considered and partial additional information about the channel or source is exploited in order to recognize if a particular channel, and consequently its source, is active.

For example, practical problems abstracted by this scenario are the own voice activity detection (OVAD) for hearing aids and headsets. The channel of interest corresponds to the invariant channel of the owner's voice to a single microphone. Detecting when the owner's voice is active, in contrast to external active speakers or noises, is of importance for automatic processing (e.g., in the hearing aid). A semi-blind solution to OVAD is provided in accordance with an aspect of the present invention to exploit training information about the owner's channel (and possibly the owner's voice) to assess if the currently identified active channel fits the owner in contrast to external sources of sound.

Methods to blindly or semi-blindly identify the channel include second order and higher order statistical approaches. The latter require large amounts of data to achieve good recognition performance, while second order methods promise speed and efficiency. GMIA, a second order method, will be applied in accordance with an aspect of the present invention to effectively capture the invariant own voice channel information in noisy scenarios.

Other applications in addition to OVAD for hearing aids and headsets are the detection of the owner's voice in video-conferencing, the detection and tracking of slowly varying dynamic speech channels in interactive speech gaming, or the detection of active speech channels in hands free communication. All can exploit a GMIA-based approach to the corresponding single input single output (SISO) problem to address more complex MIMO channel detection solutions.

The generalized mutual interdependence analysis (GMIA) method as described in "[4] Claussen H, Rosca J, Damper R (2007) Mutual interdependence analysis. In: Independent Component Analysis and Blind Signal Separation, Springer-Verlag, Heidelberg, Germany, pp 446-453"; "[5] Claussen H, Rosca J, Damper R (2008) Mutual features for robust identification and verification. In: International Conference on Acoustics, Speech and Signal Processing, Las Vegas, Nev., pp 1849-1852"; "[6] Claussen H, Rosca J, Damper R (2009) Generalized mutual interdependence analysis. In: International Conference on Acoustics, Speech and Signal Processing, Taipei, Taiwan, pp 3317-3320"; and "[7] Claussen H, Rosca J, Damper R I (2011) Signature extraction using mutual interdependencies. Pattern Recognition 44:650-661" will be briefly explained.

In accordance with various aspects of the present invention a generative model for GMIA($\lambda$) parameterized by $\lambda$ will be described and the effect of noise on the extracted features will be described. The applicability of GMIA for channel extraction and classification from monaural speech will be analyzed. The performance of GMIA for own voice activity detection and a comparison of these results with mel-frequency cepstral coefficients (MFCC) and cepstral-mean (CM) based approaches will be described.

In accordance with an aspect of the present invention voice (or signal) detection for the source of interest is provided with the reliability of multi-modal approaches such as WITTY but in the absence of additional sensors such as a bone conducting microphone.

It will be demonstrated that a single microphone signal contains invariant information about what may be the channel, or transfer function from each source to the microphone, which could be reliably exploited for signal detection and classification (e.g., OVAD).

Generalized mutual interdependence analysis (GMIA) as described in "[6] Claussen H, Rosca J, Damper R (2009) Generalized mutual interdependence analysis. In: International Conference on Acoustics, Speech and Signal Processing, Taipei, Taiwan, pp 3317-3320" will be used to extract this invariant information for both reference (training) and testing, and further to compare classification performance on the OVAD problem to MFCC and CM based approaches.

Mutual interdependence analysis (MIA) was first introduced by Claussen et al and described in "[4] Claussen H, Rosca J, Damper R (2007) Mutual interdependence analysis. In: Independent Component Analysis and Blind Signal Separation, Springer-Verlag, Heidelberg, Germany, pp 446-453" to extract a representation, also called common or mutual component, which is equally correlated with all the inputs. After successfully applying MIA to text independent speaker verification and illumination robust face recognition as described in "[5] Claussen H, Rosca J, Damper R (2008) Mutual features for robust identification and verification. In: International Conference on Acoustics, Speech and Signal Processing, Las Vegas, Nev., pp 1849-1852", 2008), the method was generalized to GMIA as described in "[6] Claussen H, Rosca J, Damper R (2009) Generalized mutual interdependence analysis. In: International Conference on Acoustics, Speech and Signal Processing, Taipei, Taiwan, pp 3317-3320" to account for different noise levels and to relax the requirement for equal correlation of the common component with each input.

GMIA is also presented in "[7] Claussen H, Rosca J, Damper R I (2011) Signature extraction using mutual interdependencies. Pattern Recognition 44:650-661". GMIA and some of its properties will be described next.

Generalized Mutual Interdependence Analysis (GMIA)

In the following let $x_i \in \mathbb{R}^D$ denote the ith input vector i=1...N and a column of the input matrix X. Moreover, $$\mu = \frac{1}{N}\sum_{i=1}^{N} x_i,$$

1 is a vector of ones and I represents the identity matrix.

Extracting a common component $s \in \mathbb{R}^D$ in the inputs X can be defined as finding a direction in $\mathbb{R}^D$ that is equally correlated with the inputs. That is:

$$\xi \underline{1} = X^T \cdot s, \text{ where } \zeta \text{ is a constant.} \quad (1)$$

This is an under-determined problem if D≥N. MIA finds an estimate of s, that is a direction denoted by $w_{MIA} \in \mathbb{R}^D$ that minimizes the projection scatter of the inputs $x_i$, under the linearity constraint to be in the span of X. That is, w=X·c. Generally, MIA is used to extract a common component from high-dimensional data D≥N.

Its cost function is given as:

$$w_{MIA} = \underset{w, w = X \cdot c}{\arg\min} \left( w^T \cdot (X - \mu \cdot \underline{1}^T) \cdot (X - \mu \cdot \underline{1}^T)^T \cdot w \right) \quad (2)$$

By solving Eqn. (2) in the span of the original inputs rather than mean subtracted inputs, a closed form solution can be found as described in "[4] Claussen H, Rosca J, Damper R (2007) Mutual interdependence analysis. In: Independent Component Analysis and Blind Signal Separation, Springer-Verlag, Heidelberg, Germany, pp 446-453":

$$w_{MIA} = \zeta X \cdot (X^T \cdot X)^{-1} \cdot \underline{1}. \quad (3)$$

The properties of MIA are captured in the following theorems:

Theorem 1.

The minimum of the criterion in Eqn. (2) is zero if the inputs $x_i$ are linearly independent.

If inputs are linearly independent and span a space of dimensionality N≤D, then the subspace of the mean subtracted inputs in Eqn. (2) has dimensionality N−1. There exists an additional dimension in $\mathbb{R}^N$, orthogonal to this subspace. Thus, the scatter of the mean subtracted inputs can be made zero. The existence of a solution where the criterion in Eqn. (2) becomes zero is indicative of an invariance property of the data.

Theorem 2.

The solution of Eqn. (2) is unique (up to scaling) if the inputs $x_i$ are linearly independent.

This is shown by the existence of the closed form solution in Eqn. (3). However, it is important to note that, if w is not constrained to the span of the inputs, any combination $\hat{w}_{MIA} + b$ with b in the nullspace of X is also a solution. Also, the MIA problem has no defined solution if the inputs are zero mean i.e., if $X \cdot \underline{1} = \underline{0}$. The reason is that there exists w=$\underline{0}$ in the span of the inputs as a trivial solution to Eqn. (2).

The MIA data model in Eqn. (1) is extended as described in "[6] Claussen H, Rosca J, Damper R (2009) Generalized mutual interdependence analysis. In: International Conference on Acoustics, Speech and Signal Processing, Taipei, Taiwan, pp 3317-3320" by Claussen et al. to incorporate measurement noise $n \sim \mathcal{N}(0, C_n)$ and to relax the equal correlation constraint from $\zeta \underline{1}$ to r:

$$r = X^T \cdot w + n \quad (4)$$

It is assumed that w to be a random variable. One goal is to estimate $w \sim \mathcal{N}(\mu_w, C_w)$ assuming that w and n are statistically independent. Given the model in Eqn. (4), the generalized MIA criterion (GMIA) is defined as:

$$w_{GMIA} = \mu_w + C_w \cdot X \cdot (X^T \cdot C_w \cdot X + C_n)^{-1} \cdot (r - X^T \cdot \mu_w) \quad (5)$$

$$= \mu_w + (X \cdot C_n^{-1} \cdot X^T + C_w^{-1})^{-1} \cdot X \cdot C_n^{-1} \cdot (r - X^T \cdot \mu_w) \quad (6)$$

Throughout the remainder herein, the GMIA parameters are $C_w = I$, $C_n = \lambda I$, $r = \zeta \underline{1}$ and $\mu_w = \underline{0}$. This parameterization is referred to by $$GMIA(\lambda) = \zeta X \cdot (X^T \cdot X + \lambda I)^{-1} \cdot \underline{1} \quad (7)$$

When $\lambda \to \infty$, the GMIA solution represents the mean of the inputs. Indeed, the inverse $$(X^T \cdot X + \lambda I)^{-1} \to \frac{1}{\lambda} I$$

simplifying the solution to $$w_{GMIA} \to \frac{\zeta}{\lambda} X \cdot \underline{1}.$$

Furthermore, MIA (solution to Eqn. (3)) is equivalent to GMIA(λ) when λ=0. In the rest herein, MIA is denoted by GMIA(0) to emphasize their common theoretical foundation.

The factor $\zeta$ is a constant. In one embodiment of the present invention one sets $$\zeta = \frac{1}{\|X \cdot (X^T \cdot X + \lambda I)^{-1} \cdot \underline{1}\|}.$$

Applying one or more formulas or expressions of equations (2)-(7) herein is considered to apply methods of mutual interdependence analysis. Applying one or more formulas of equations (4)-(7), such as application of the formula of equation (7) or equations derived thereof is considered herein to apply a method of general mutual interdependence analysis or a method of GMIA. This applies also to equations disclosed below.

Generative Signal Model for GMIA

This section evaluates the behavior of GMIA(λ) for different types and intensities of additive distortions. In particular, we evaluate the effect of noise components that are either recurring uncorrelated components or Gaussian noise. The generative signal model as described in "[7] Claussen H, Rosca J, Damper R I (2011) Signature extraction using mutual interdependencies. Pattern Recognition 44:650-661" is applied to generate synthetic data with various properties. In contrast to published work a gradual change is shown in the intensities of the different noise types and the feature extraction result is compared to the true feature desired. This allows an interpretation of GMIA(λ) and analysis of its performance on data with unknown noise conditions from the field.

Assume the following generative model for input data x:

$$x_1 = \alpha_1 s + f_1 + n_1 \quad (8)$$
$$x_2 = \alpha_2 s + f_2 + n_2$$
$$\vdots$$
$$x_N = \alpha_N s + f_N + n_N$$

where s is a common, invariant component or feature that is aimed to be extracted from the inputs, $\alpha_i$, i=1, ..., N are scalars (typically all close to 1), $f_i$, i=1, ..., N are combinations of basis functions from a given orthogonal dictionary such that any two are orthogonal and $n_i$, i=1, ..., N are Gaussian noises. It will be shown that GMIA estimates the invariant component s, inherent in the inputs x.

The model is made precise. As before, D and N denote the dimensionality and the number of observations. Additionally, K is the size of a dictionary B of orthogonal basis functions. Let B=[$b_1$, ..., $b_K$] with $b_k \in \mathbb{R}^D$. Each basis vector $b_k$ is generated as a weighted mixture of maximally J elements of the Fourier basis which are not reused ensuring orthogonality of B. The actual number of mixed elements is chosen uniformly at random, $J_k \in \mathbb{N}$ and $J_k \in \mathcal{U}(1, J)$. For $b_k$, the weights of each Fourier basis element i are given by $w_{jk} \sim \mathcal{N}(0,1)$, j=1, ..., $J_k$. For i=1, ..., D (analogous to a time dimension) the basis functions are generated as:

$$b_k(i) = \frac{\sum_{j=1}^{J_k} w_{jk} \sin\left(\frac{2\pi i \alpha_{jk}}{D} + \beta_{jk}\frac{\pi}{2}\right)}{\sqrt{\frac{D}{2}\sum_{j=1}^{J_k} w_{jk}^2}}$$

with $$\alpha_{jk} \in \left[1, \ldots, \frac{D}{2}\right]; \beta_{jk} \in [0, 1];$$

$$[\alpha_{jk}, \beta_{jk}] \neq [\alpha_{lp}, \beta_{lp}] \forall\, j \neq l \text{ or } k \neq p.$$

In the following, one of the basis functions $b_k$ is randomly selected to be the common component $s \in [b_1, \ldots, b_K]$. The common component is excluded from the basis used to generate uncorrelated additive functions $f_n$, n=1, ..., N. Thus only K−1 basis functions can be combined to generate the additive functions $f_n \in \mathbb{R}^D$. The actual number of basis functions $J_n$ is randomly chosen, i.e., similarly to $J_k$, with J=K−1. The randomly correlated additive components are given by:

$$f_n(i) = \frac{\sum_{j=1}^{J_n} w_{jn} c_{jn}(i)}{\sqrt{\sum_{j=1}^{J_n} w_{jn}^2}}$$

with $$c_{jn} \in [b_1, \ldots, b_K]; c_{jn} \neq s, \forall j,n; c_{jn} \neq c_{lp}, \forall j \neq l \text{ and } n=p.$$

Note that $\|s\|=\|f_n\|=\|n_n\|=1$, $\forall n=1, \ldots, N$. To control the mean and variance of the norms of common, additive and noise components in the inputs, each component is multiplied by the random variable $a_1 \sim \mathcal{N}(m_1, \sigma_1^2)$, $a_2 \sim \mathcal{N}(m_2, \sigma_2^2)$ and $a_3 \sim \mathcal{N}(m_3, \sigma_3^2)$, respectively. Finally, the synthetic inputs are generated as:

$$x_n = a_1 s + a_2 f_n + a_3 n_n \quad (9)$$

with $\Sigma_{i=1}^D x_n(i) \approx 0$. The parameters of the artificial data generation model are chosen as D=1000, K=10, J=10 and N=20.

Throughout the experiments the parameters $m_1=1$, $\sigma_1=0.1$, $\sigma_2=0.1$ and $m_3=0$ of the distributions for $a_1$, $a_2$ and $a_3$ are kept constant. The mean amplitude $m_2$ of the recurring uncorrelated components and the variance $\sigma_3$ of the Gaussian noise are varied and its effect on GMIA(0), GMIA($\lambda$) and the sample mean is illustrated in FIG. 1.

The figure shows a matrix of 3D histograms for different parameters $m_2$ and $\sigma_3$. Each point in a histogram represents an experiment for a given value of $\lambda$ (x-axis). The y-axis indicates the correlation of the GMIA solution with s, the true common component. The intensity (z-axis) of the point represents the number of experiments, in a series of random experiments, where this specific correlation value for the given $\lambda$ was obtained. Overall, 1000 random experiments were performed with randomly generated inputs using various values of $\lambda$ per histogram.

Results show that a change in the mean amplitude $m_2$ of the recurring uncorrelated components $f_i$ has a minimal effect on GMIA(0) but greatly affects the correlation coefficient of s with the sample mean. That is, the sample mean results is a good representation of s only if $m_2$ is low and the common component s is dominant in the data. Moreover, this indicates that GMIA(0) succeeds in finding a good representation of s.

The second row of FIG. 1 shows that an increased variance $\sigma_3$ of the noise can improve the GMIA(0) result. The increased noise level appears to acts as a regularization in the matrix inversion when computing GMIA. This has the same effect as an increased value of the regularization parameter $\lambda$.

Moreover, the experiments show that the results for all $\lambda$ suffer for high noise variances $\sigma_3$, but that the spectral mean is affected the most. In all experiments, GMIA($\lambda$) performs equally or outperforms GMIA(0) and the spectral mean. This demonstrates that GMIA is more versatile than the spectral mean in extracting a common component from data with an unknown and possibly varying distortion.

In the following section it will be evaluated how the extraction results are affected for non stationary, real world data such as speech.

FIG. 1 illustrates histograms of GMIA($\lambda$) extraction performance for different levels of additive Gaussian noise and uncorrelated additive components $f_i$. The mean of the inputs extracts the common component s well for low energy contributions of $f_i$. Small levels of Gaussian noise result in a drop of the GMIA(0) performance. Larger amount of Gaussian noise results first in an improved GMIA(0) performance and later in a reduced extraction result overall $\lambda$. High levels of noise are better addressed by GMIA(0) than the mean.

Channel Extraction from Mono Speech Recordings

Figure 2:
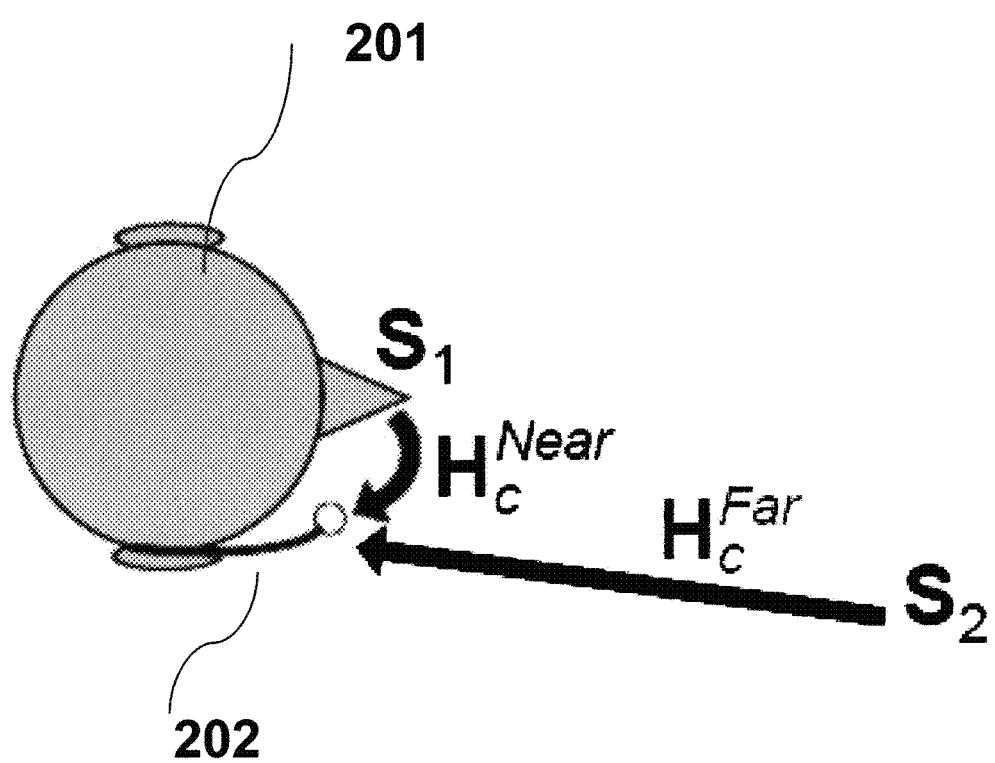
FIG. 2 illustrates an own voice activity detection scenario in accordance with an aspect of the present invention.

Consider a single microphone recording of near-field and far-field conversational speech as illustrated in FIG. 2. As noted above, a potential application of GMIA is to extract channel features in the context of owner speech detection for hearing aids. This problem has been referred to as own-voice activity detection (OVAD), to imply the recognition of when the wearer of the hearing-aid (owner) is talking and when an external-speaker is talking in a conversation (between the owner and the external-speaker). Such a detection facilitates, for example, the hearing-aid signal processing to be adapted dynamically to own-voice (OV) or external-speaker (EXT) characteristics.

A model for the recorded signal and its dependence on speaker and channel characteristics is provided in accordance with an aspect of the present invention. Data from one or more speakers for fixed positions (i.e., exhibiting common channels) will be used, as in FIG. 2, to extract channel information using GMIA. Later, the OVAD problem is addressed.

FIG. 2 illustrates an Own voice activity detection (OVAD) scenario: Person 201 is wearing a headset 202. Speech from near-field S1 (own) or far-field S2 (external sources), recorded on a single microphone, incorporates channel information, e.g., $H_c^{Near}$ or $H_c^{Far}$ respectively.

The headset may be a headset comprising an audio output device such as a loudspeaker enabling the speaker to hear the sound that was received and provided by at least one microphone. The at least one microphone is part of the headset. In one embodiment of the present invention the headset may include at least two microphones. In a further embodiment the two microphones provide signals to a processor that applies beamforming to the at least two signals from the at least two microphones to detect a direction of an acoustic signal to provide the headset with directional capabilities. In one embodiment of the present invention the headset is an integrated hearing aid with one or more microphones and an audio output device, integrated in a single body and worn behind the ear or in the ear, which is also illustrated as element 202 in FIG. 2.

Speech and Channel Models

A speech signal can be modeled as an excitation that is convolved with a linear dynamic filter, which represents the channel including the microphone characteristic, the channel impulse response of the environment, and the vocal tract. The excitation signal can be modeled for voiced speech as a periodic signal and for unvoiced speech as random noise as described in "[8] Deng L, O'Shaughnessy D (2003) Speech Processing: A Dynamic and Optimization-Oriented Approach. Signal Processing and Communications, Marcel Dekker, Inc. Let $E^{(p)}$, $H_v^{(p)}$, $H_c$ and $S^{(p)}$ be the spectral representations of the excitation or pitch signal (covering the lungs and vocal chords), the vocal tract filter (covering the mouth, tongue, teeth, lips, and nasal cavity), the external channel impulse response and the speech signal parts of person p respectively. Note that the channel impulse response implicitly depends on the spatial location of the receiver. This can vary substantially from near-field to far-field, or even over different far-field only or near-field only locations.

If the environment of the speaker is invariant (e.g., the speaker does not move significantly) and simplifying assumptions are made to idealize the spectrum and capture important features at the timescale of interest, assume the data can be modeled as: $S^{(p)} = E^{(p)} \cdot H_v^{(p)} \cdot H_c$. For person p and instance i, one obtains:

$$\log S_i^{(p)} = \log E_i^{(p)} + \log H_v^{(p)} + \log H_c \quad (10)$$

The instance i implicitly represents the timescale of interest, for example a timescale of the order of the pitch period (10-20 ms) or of the order of the average word period (500 ms).

$E_i^{(p)}$ is nonstationary in general for timescales larger than the pitch period, while $H_v^{(p)}$ may capture invariant characteristics of the speaker's vocal tract as well as phoneme-specific characteristics (and underlying speech neural control) which can be considered stationary, and hence invariant within phonetic timescales, in keeping with the quasi-stationary assumptions of the speech process. The spectrum of the excitation changes slowly for voiced sounds, and appears unchanged although radically different over the duration of a consonant, at the phonetic timescale. A detailed analysis of these components of the speech production model is beyond present scope. This fundamental model of speech production extended with the external channel transfer function is the basis for defining inputs $x_i$ and the corresponding timescales where various components play the role of s and $f_n$ from Eqn. (9).

For example Claussen et al. as described in "[7] Claussen H, Rosca J, Damper R I (2011) Signature extraction using mutual interdependencies. Pattern Recognition 44:650-661" use training data from different nonlinearly distorted channels for each person from various portions of the NTIMIT database as provided in "[11] Fisher W M, Doddington G R, Goudie-Marshall K M, Jankowski C, Kalyanswamy A, Basson S, Spitz J (1993) NTIMIT. CDROM". The intuition was that the channel variation results in a low contribution of the channel in the GMIA extract while the vocal tract characteristic $\log H_v^{(p)}$ is retained. In contrast, herein training instances $x_i$ were considered from multiple people exploring an identical external channel $H_c$ (e.g., from the same external position and using the same microphone, which is the case for own voice recordings in OVR). In this case the $\log E_i^{(p)}$ and $\log H_v^{(p)}$ components in Eqn. (10) play the role of the orthogonal components $f_n$ in the synthetic model (Eqn. (9)), while $\log H_c$ is the invariant. In such a setup, GMIA can be used to identify invariant characteristics of the channel (e.g., near-field channel for OVR).

The invariant component related to $\log H_c$ or $H_c$ is related to the channel. The GMIA extract related to $\log H_c$ or $H_c$ is called herein a signature or also a GMIA signature of the channel. Rather than determining a full transfer function of a channel, in accordance with an aspect of the present invention a (invariant) GMIA signature of the channel is determined. The characteristic or transfer function of a specific channel between a source like a voice and a target such as a microphone is assumed to have at least some invariant properties that uniquely distinguish it from another channel. More specifically, the invariant properties of a near field channel, for instance with a distance less than 30 cm between a speaker and a microphone, are distinguishably different from a far-field channel, with a distance of a speaker to the microphone at least greater than 30 cm and preferably greater than 1 m.

In accordance with an aspect of the present invention, a GMIA signature of a near-field channel extracted from a plurality of individual voices applied to the near-field channel is distinguishably different from a GMIA signature of a far-field channel extracted from a plurality of individual voices applied to the far-field channel.

In accordance with a further aspect of the present invention a near-field channel GMIA signature is extracted from a user of the microphone by a processor. The processor checks by comparison if the signature from the user is like the near-field channel GMIA signature. In accordance with a further aspect of the present invention the processor checks if the user signature is more unlike the near-field channel GMIA signature. In accordance with yet a further aspect of the present invention, the processor checks if the user signature is more like a far-field channel GMIA signature.

The problem of Own Voice Activity has thus been reduced to the detection of a "near-field channel." Assuming that at 30 cm or less only the user of an integrated microphone in a hearing-aid uses the extracted near-field channel to that microphone, a detection of the use of this near-field channel convincingly indicates Own Voice Activity.

Note that there are many possible near field channels. Herein, in accordance with an aspect of the present invention a channel is recognized that is similar to the one that was trained from. That is, this could be only one channel (one defined point of the source and point of the receiver). One may call this a first near-field channel. However, this could also be two or more near field channels vs. far field channels. One may call this a plurality of near field channels. One may also select a number of near field channels that would be representative for significant near field channels, for instance within a range of near-field channels. One may call this a representative near-field channel. The term near-field channel will be used. This term is used to cover both a first near-field channel as well as a representative near-field channel unless stated explicitly differently.

The complex process of Own Voice recognition has thus been avoided and is replaced with detecting use of a near-field channel using for instance GMIA methods. Furthermore, by using signature extraction through GMIA methods and by extracting a speaker invariant property of the near-field channel, the processor for near-field channel signature extraction can be trained and programmed off-line for the extraction of the near-field GMIA signature and can be applied with no or little voice training in for instance an integrated hearing device by any user.

Speaker invariant signature extraction of a channel in one embodiment of the present invention is performed by applying generalized mutual interdependence analysis (GMIA). One speaker invariant property of a channel is of course its transfer function. However, determining a transfer function of a channel requires extensive methods, and can generally not be easily achieved from random voices of different speakers. In one embodiment of the present invention, a channel signature is extracted from common sound signals such as voice signals.

In accordance with an aspect of the present invention a source independent channel signature such as a near-field channel signature is extracted from sound from a plurality of individual voices. In accordance with an aspect of the present invention a channel signature such as a near-field channel signature is extracted from sound by applying GMIA methods. Other methods of extraction of a channel signature with reduced dimensionality are explained herein and compared to GMIA. More specifically MFCC (mel frequency cepstral coefficients) and CM (cepstral-mean) methods are provided herein and described further below in accordance with one or more aspects of the present invention. Applying MFCC (mel frequency cepstral coefficients) to determine a channel signature is called MFCC (mel frequency cepstral coefficients) analysis herein. Applying CM (cepstral-mean) to determine a channel signature is called CM (cepstral-mean) analysis herein.

The channel signatures as provided herein in accordance with one or more aspects of the present invention are different from a transfer function of a channel. Methods that use the transfer function to a voice signal at the input of a channel to determine the voice signal at the output cannot be applied by using the signature.

Various portions of the TIMIT database as provided in "[12] Garofolo J S, Lamel L F, Fisher W M, Fiscus J G, Pallett D S, Dahlgren N L, Zue V (1993) TIMIT acoustic-phonetic continuous speech corpus. CDROM" are used for the experiments in this section. TIMIT contains speech from 630 speakers that is recorded with a high quality microphone in a recording studio like environment. Each speaker is represented by 10 utterances. The TIMIT speech is convolved with a head related transfer function (HRTF) to simulate various invariant channels. The output of an algorithm for channel identification can thus be compared directly with the true HRTF used to generate the data.

In one embodiment of the present invention a HRTF was chosen from a position on the right side of a dummy head with a source distance of 20 cm, azimuth of 0 deg and at an elevation of −30 deg as invariant channel, and a HRTF for the right side of the dummy head with a source distance of 160 cm, azimuth of 0 deg and at an elevation of 0 deg as external channel. The HRTF data has been obtained from "[18] Qu T, Xiao Z, Gong M, Huang Y, Li X, Wu X (2009) Distance-dependent head related transfer functions measured with high spatial resolution using a spark gap. IEEE Transactions on Audio, Speech and Language Processing 17(6):1124-1132."

Thereafter, the data is windowed with half overlapping Hann windows of 0.2 s length and transferred into the power spectral domain.

Other positions of the microphone can be selected. In one embodiment of the present invention a microphone has a near-field channel that covers a distance that is not greater than 30 cm from the microphone to a source or the lips of a speaker. In one embodiment of the present invention a microphone has a near-field channel that covers a distance that is not greater than 25 cm from the microphone to a source or the lips of a speaker.

In one embodiment of the present invention a microphone has a near-field channel that covers a distance that is not greater than 25 cm from the microphone to a source or the lips of a speaker. In one embodiment of the present invention a microphone has a far-field channel that covers a distance that is not smaller than 50 cm from the microphone to a source or the lips of a speaker. In one embodiment of the present invention a microphone has a far-field channel that covers a distance that is not smaller than 100 cm from the microphone to a source or the lips of a speaker. In one embodiment of the present invention a microphone has a far-field channel that covers a distance that is not smaller than 160 cm from the microphone to a source or the lips of a speaker. In one embodiment of the present invention a microphone has a far-field channel that covers a distance that is not smaller than 200 cm from the microphone to a source or the lips of a speaker.

One goal in accordance with an aspect of the present invention is to apply GMIA to extract channel information, and evaluate if GMIA representations can be used to distinguish different channels. Person dependent information is minimized by introducing variation in the excitation $E_i^{(p)}$ using speech from both voiced and unvoiced signals. Note that, speech signals contain silence periods where no channel information is present. Furthermore, voiced speech is sparse in the spectral domain. Therefore, not all parts of the channel characteristic are fully represented at all times. Clearly, the channel does not equally correlate with the spectral information of the speech from different time windows. A GMIA representation will be computed separately from speech of the same or multiple speakers.

Speaker Model

For one person $p_0$, consider the vector $x_i$ obtained from a speech clip i $$x_i = \log S_i^{(p_0)} = (\log H_c + \log H_v^{(p_0)}) + (\log E_i^{(p_0)}) \approx s + f_i \quad (11)$$

Data as above is used for one single person and with channels for near- and farfield given by the HRTFs to the right side of the dummy head. According to the data model in Eqn. (11) it is expected that GMIA computes a common component capturing information about both the channel and the speaker characteristics. Indeed, $\log H_c + \log H_v^{(p)}$ is invariant to the actual clip i used as input. Next GMIA is computed and the result correlated with known channel information (HRTF) to verify the hypothesis.

Figure 3:
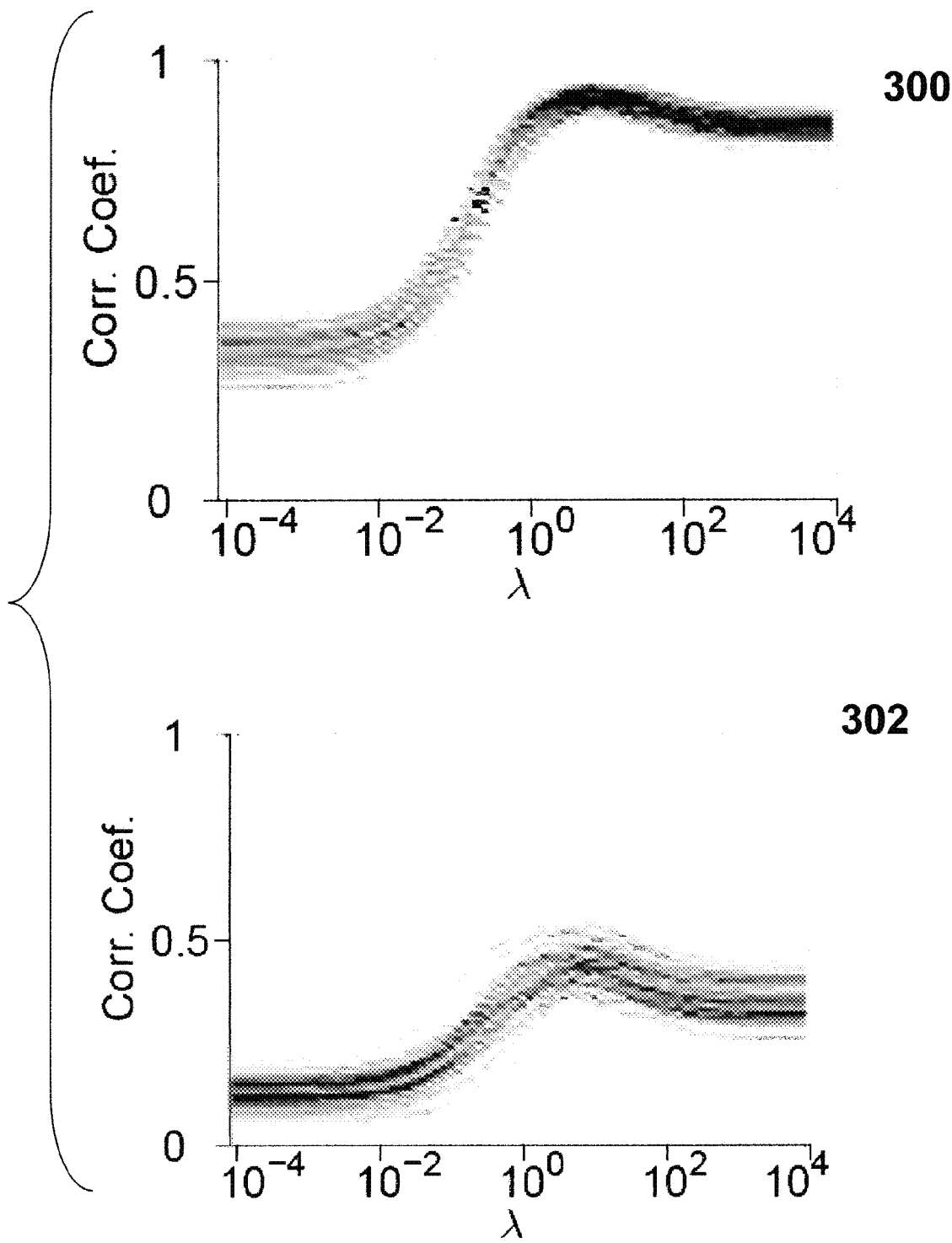
FIGS. 3 and 4 illustrate effects of a head related transfer function in data in accordance with an aspect of the present invention.

All experiments are repeated for 100 speakers and various values of λ. FIG. 3 graph 300 illustrates the histogram of the correlation coefficients of the GMIA extracted from the near-field speech with the ground truth near-field HRTF for a 20 cm source/receiver distance. Note that both $w_{GMIA\,(10^{-4})} \approx w_{MIA}$ and $w_{GMIA\,(10^4)} \approx \mu$ (the mean of the inputs) do not compute maximal correlation coefficients. The median correlation value at $\lambda = 10^1$ is 0.9, demonstrating that GMIA can extract good representations of the original HRTF. In contrast FIG. 3 graph 302 shows histograms of the correlation coefficients with the HRTF from a far field position (160 cm source/ receiver distance) that was not used in the data generation. The low correlation coefficients indicate that channel characteristics are well separable with the extracted GMIA representations.

FIG. 3, graphs 300 and 302 illustrate histograms as vertical slices of the plot of the correlation coefficients between GMIA($\lambda$), for a fixed value of $\lambda$, from single speaker data and two different HRTFs. Dark gray bins represent a large number and light gray bins a low number of instances with a particular correlation coefficient. In graph 300 the HRTF used to generate the speech data is well represented by the GMIA($\lambda$) result for $\lambda=10^1$, resulting in a mean correlation coefficient of 0.9. In graph 302 an HRTF that is not contained in the speech data minimally correlates with the GMIA extract. Note that FIG. 3, graph 300 is similar to FIG. 1 for $\sigma_3=0.1$ and $m_2=5$, which represents the case where the common component intensity varies over different training instances. This confirms that for speech the channel is not equally correlated with the spectral information from different time windows.

Channel Model

The previous section shows that the GMIA projection correlates well with the channel and that it can be used as feature for channel detection or as classifier of the channel. In one embodiment of the present invention it is desired to make the model in Eqn. (11) more precise and eliminate the speaker dependence as much as possible. For this data from multiple speakers $p_i$ with i=1 . . . N is used as follows:

$$x_i = \log S_i^{(pi)} = (\log H_c) + (\log E_i^{(pi)} + \log H_v^{(pi)}) \approx s + f_i \quad (12)$$

It is expected to compute a common component that better captures the channel. The experiment is performed as follows. First, a number of speakers, corresponding to the number of training instances N in an above section, are selected randomly from the TIMIT database. One of their 10 utterances is randomly selected and convoluted with the previously chosen near-field HRTF. Thereafter, one speech segment (e.g., 0.2 s long) is randomly selected from each speaker. These segments are thereafter used to extract a GMIA representation in the log-spectral domain. The experiment is repeated for 100 randomly selected sets of speakers and various values of $\lambda$.

Figure 4:
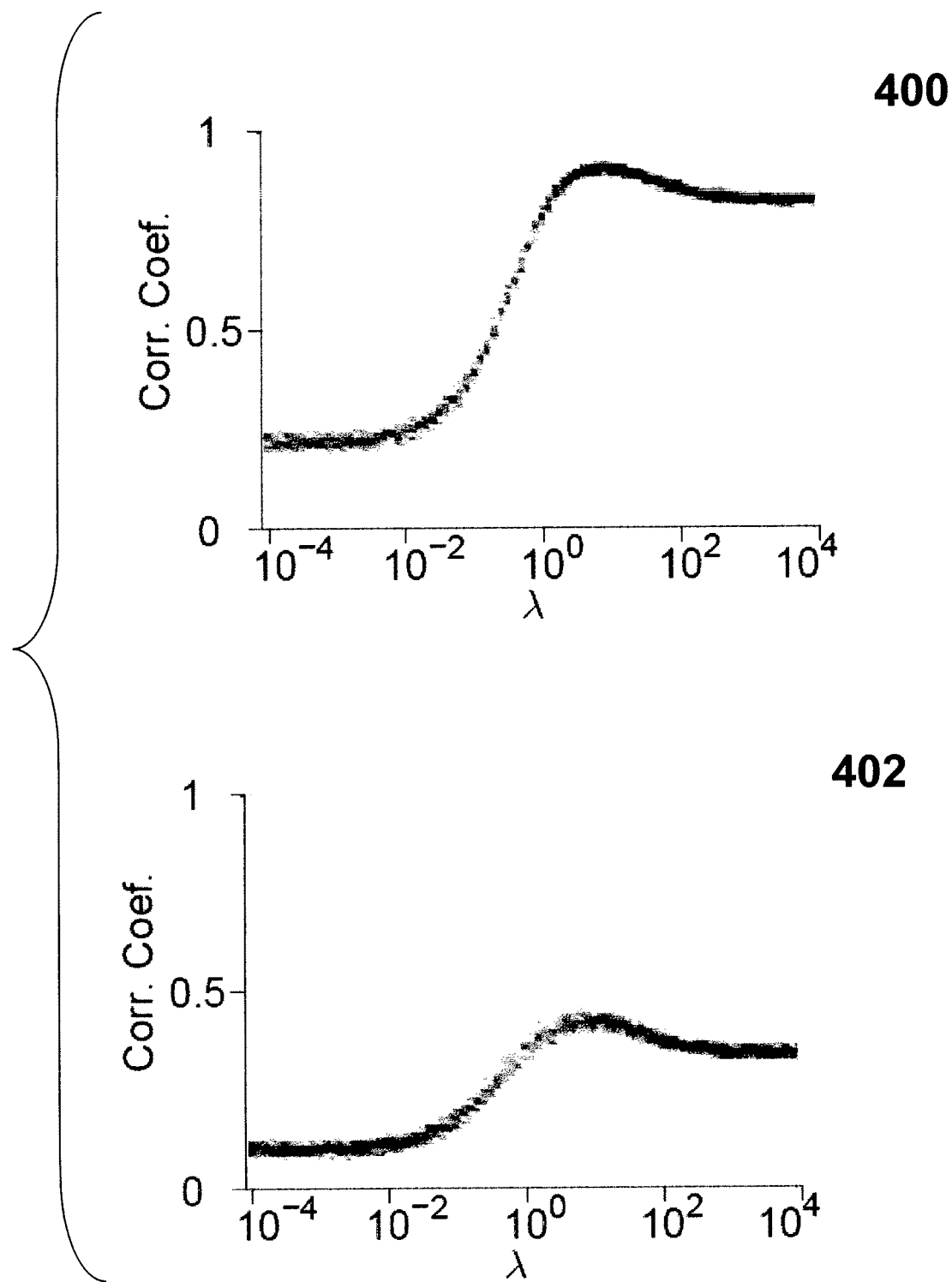

FIG. 4, graph 400 shows a histogram of the correlation coefficients of the GMIA result and the ground truth for the channel, the near-field HRTF. FIG. 4, graph 402 illustrates the correlation coefficients between the GMIA extract and the HRTF from the external channel (160 cm source/receiver distance) that was not used in the data generation.

Indeed, FIG. 4 shows a reduced variance of the correlation coefficients for different speakers compared to FIG. 3 and thus a more reliable extraction of the channel. GMIA will be further used for channel estimation in the OVAD problem.

FIG. 4 graphs 400 and 402 provide histograms (vertical slices of the plot) of the correlation coefficients between GMIA($\lambda$) from multiple speaker data and two different HRTFs. Dark gray bins represent a large number and light gray bins a low number of instances with a particular correlation coefficient. (FIG. 4, graph 400) The HRTF that is convolved with the data is well extracted for GMIA($\lambda$) with $\lambda=10^1$ resulting in a mean correlation coefficient of 0.9. The variance of the result is lower than for GMIA($\lambda$) from single speaker data (see FIG. 3) (302). The HRTF that is not contained in the data only minimally correlates with the GMIA extract.

Own Voice Activity Detection (OVAD)

The efficacy of GMIA was demonstrated above to extract channel features using a known HRTF as the channel convolved with the TIMIT speaker data under both speaker model and channel model formulations. Next, this is further extended in accordance with and aspect of the present invention to a realistic scenario of own-voice activity detection (OVAD) using the same large speaker database convolved with near-field and far-field HRTFs to closely approximate own-voice speakers and external-speakers.

In the experimental scenarios used here with such data for OVAD, though the underlying HRTF information is available (as was used above for measuring the correlation coefficients between extracted MIA features and the reference HRTF), it is assumed that the underlying HRTF information to be unknown and unavailable, thereby treating them as implicit in the speech data (as is the case with real recorded OV and EXT speaker data at an hearing aid). For this purpose, the underlying OV and EXT channel information are equivalently considered only in the form as available by means of estimates of channel information from held-out reference data, such as by the GMIA extraction provided here. Thus, in this scenario, how well the GMIA based features offer a good own-voice recognition performance when set in a channel detection framework will serve to demonstrate the effectiveness of GMIA to extract the underlying channel information from the actual OV and EXT speech data.

Towards this, the use of GMIA based channel features for OVAD is demonstrated in a verification framework posed as an hypotheses testing problem. Further, in order to provide a comparative reference for the GMIA based approach, two alternate approaches are considered: one using cepstral-mean as an alternate channel feature and set in the same verification framework, and the other using the conventional speech feature, namely MFCC (mel frequency cepstral coefficients), set in a speaker-verification framework. Applied is a 100 speaker database convolved with near-field and far-field HRTFs to closely represent own voice and external speakers. The performance of these three verification systems are given and compared in terms of the equal-error-rate (EER) measure. Additionally, given that GMIA is specifically formulated to handle real world data with additive noise, the effectiveness of GMIA for noisy data is also demonstrated by considering three noise-conditions, namely, street, car and music noises at different SNRs (clean, 20 dB, 10 dB, 0 dB, −10 dB and −20 dB) and show how its parameterization (in terms of $\lambda$—the assumed noise variance) allows a superior performance at a range of optimal $\lambda$, in comparison to the other two approaches (cepstral-mean and MFCC based speaker-verification).

GMIA Based Verification Framework for OVAD

Given the conversational speech signal, the OVAD problem can be reduced to that of detecting the underlying channel. This in turn involves extracting the channel feature from the speech signal and classifying it as own-voice or external-speaker channel, thereby comprising a 2-class problem. Alternately, this can also be viewed as a 'own-voice verification' problem (for example, as in speaker-verification), set in a hypothesis testing framework of deciding between the two hypotheses:

$H_0$: Input speech segment is own-voice
$H_1$: Input speech segment is not own-voice (i.e., external-speaker)

The verification framework adopted here is essentially as in speaker-verification, which is well established and described in "[2] Bimbot F, Bonastre J F, Fredouille C, Gravier G, Magrin-Chagnolleau I, Meignier S, Merlin T, Ortega-Garcia J, Petrovska-Delacretaz D, Reynolds D A (2004) A tutorial on text-independent speaker verification. EURASIP Journal on Applied Signal Processing 4:430-451" and "[19] Reynolds D A, Campbell W M (2007) Text-independent speaker recognition. In: Benesty J, Sondhi M, Huang Y (eds)

Handbook of Speech Processing and Communication, Springer-Verlag GMBH, pp 763-781."

This is outlined here as adopted to the channel verification task: Given a set of OV and EXT speakers, a test OV speaker is verified as OV speaker with respect to a set of OV channel features extracted from another set of OV speakers. The latter is referred to as 'reference' OV channel features, and serves to represent the underlying unknown OV channel, as extracted by GMIA; such a channel information, by virtue of being speech- and speaker-independent, can be expected to be invariant across a set of OV speakers, and to generalize to an unseen test OV speaker. Likewise, a test external (EXT) speaker can be verified as 'not OV' speaker against the same set of reference OV channel features. In general, a set of test OV/EXT speakers represented in terms of their channel features are verified in this manner with respect to another set of reference OV channel features, thus constituting a statistically robust channel verification task.

Ideally, the OV test GMIA features ought to yield high correlation scores (or alternately, low distance scores) with OV reference channel features, while the EXT test GMIA features yield low correlation scores with the OV reference channel features. If the features represent the OV, EXT channels well and offer good separability in the GMIA feature space, the corresponding OV, EXT score distributions are also well separated. An optimal threshold is determined on the OV and EXT score distributions which minimizes false-rejections (fr, which is the number of true OV features rejected as 'not OV') and false-acceptances (fa, which is the number of true EXT features accepted as 'OV'). The corresponding equal-error-rate (EER) of (Prob(fr), Prob(fa)) is reported as the OVR system performance, with lower EER implying a better performance.

Alternate Approaches

In order to provide a baseline reference to the OVAD by GMIA based channel features as discussed above, also two other alternatives to OVAD are considered: one using an alternate channel feature extraction, namely, the 'cepstral-mean', and another using a speaker-verification approach wherein OVR is carried out in terms of verifying whether the input speaker is the wearer or not.

Cepstral-Mean (CM) Based OVAD

The Mean vector obtained from GMIA for large $\lambda$ ($\lambda \to \infty$) corresponds to the mean of the log-spectral vectors in a clip (analysis window for extracting a GMIA vector).

Alternately, one can consider the mean of the cepstral vectors derived by an inverse FFT or DCT of the log spectral vectors, as is done for deriving cepstral coefficients or MFCCs in speech recognition as described in "[16] Huang X, Acero A, Hon H W (2001) Spoken Language Processing: A guide to Theory, Algorithm, and System Development. Prentice Hall." This mean vector, referred to as 'cepstral-mean' (CM) in speech recognition, is popularly used in the context of cepstral-mean-normalization (CMN) for channel compensation as described in "[16] Huang X, Acero A, Hon H W (2001) Spoken Language Processing: A guide to Theory, Algorithm, and System Development. Prentice Hall" and "[1] Benesty J, Sondhi M M, Huang (2008) Handbook of Speech Processing. Springer."

Here, it is already a well established concept that the cepstral-mean of the log spectra of long speech intervals approximates the channel cepstral and that subtraction of this long-term averaged cepstral-mean from the individual frames of cepstral features removes the channel effect, thereby rendering the resultant cepstral vectors robust to channel variability (such as arising from channel differences in telephony speech recognition due to differences in hand-set, physical channel media, wireless network channels etc., particularly between training and test conditions).

Speaker-Verification Based OVAD

In a OVAD task, the OV speaker is fixed and given and can be made to provide training data to define OV models that characterize the OV speaker. By this, the OVAD task can be alternately defined as a conventional speaker-verification task of treating the OV speaker as the target speaker and EXT speakers as the impostor speakers.

For this, it becomes necessary to use conventional 'speaker' feature representations, such as MFCC (mel-frequency-cepstral-coefficients) as described in "[2] Bimbot F, Bonastre J F, Fredouille C, Gravier G, Magrin-Chagnolleau I, Meignier S, Merlin T, Ortega-Garcia J, Petrovska-Delacretaz D, Reynolds D A (2004) A tutorial on text-independent speaker verification. EURASIP Journal on Applied Signal Processing 4:430-451" and "[19] Reynolds D A, Campbell W M (2007) Text-independent speaker recognition. In: Benesty J, Sondhi M, Huang Y (eds) Handbook of Speech Processing and Communication, Springer-Verlag GMBH, pp 763-781." In this case, the OV speaker is represented by a statistical model (GMM) or a non-parametric model (VQ) in the MFCC feature space.

The distribution of the MFCC vectors (and the GMM or VQ based representation of this distribution) of a speaker characterizes the unique acoustic signature or footprint of that speaker in the MFCC feature space as manifesting in the unique spectral characteristics of his voice, manner of articulation of the different sounds of the language (phonemes) and spectral dynamics (which can be potentially captured in the delta and delta-delta MFCCs).

The OV and EXT speaker data occupy different regions in the feature space, by virtue of the fact that the spectral characteristics of each of these speech is a result of convolution with different channels (here, HRTF). An OV speaker model thereby offers a better match with OV test speaker data than with EXT test speaker data, which then becomes the primary basis of OVAD by MFCC based speaker-verification. The verification task is thus essentially as described above, but constituting a 'speaker' verification (as against 'channel' verification, since the MFCC features here serve as 'speaker' features) in this case taking the form of computing OV scores between OV test MFCC vectors and the OV models and EXT scores between EXT test MFCC vectors and the OV models, subsequently forming the OV and EXT score distributions and then determining the EER.

Experimental Setup

Here, the experimental details are presented of the three OVAD tasks, namely, GMIA based channel verification, cepstral-mean (CM) based channel verification and MFCC based speaker-verification. These three frameworks are as described generically earlier above. While the three tasks have specific differences due to their underlying idiosyncratic frameworks, they share an overall experimental scenario, comprising the following common aspects.

All the OVAD experiments use a randomly selected (but fixed) subset of 100 speakers from the TIMIT database (of 630 speakers) as the test set of OV and EXT speakers, with each speaker having 10 sentences, each 3 to 4 seconds duration. The fixed subset of 100 test speakers is convolved with single fixed near-field and far-field HRTFs to generate the own-voice and external type of speakers respectively (referred to as OV and EXT henceforth); the HRTFs used here are as described above.

In order to examine the noise robustness of GMIA and the two alternate approaches, three different noise conditions are considered, namely, street, car and music, and five SNRs for each of these noise conditions (20 dB, 10 dB, 0 dB, −10 dB and 20 dB), in addition to the clean case. The specific noise data is added to the original clean TIMIT sentences at the desired SNR subsequent to the HRTF convolutions, i.e., to the OV and EXT data.

Next the specific variations in the experiments for each of the three OVAD tasks are described.

GMIA Based OVAD

While the 100 speakers as defined above constitutes the test data, GMIA experiments use a set of 300 speakers (different from the 100 test speakers) to define the 'reference' OV channel feature. This is motivated by the earlier above provided channel model formulation, where a GMIA vector is extracted in a speaker-independent manner.

Here, a single GMIA reference vector is extracted from the 300 speaker clean data, i.e., with N=300, as defined in an above section. For the noise-added experiments, only the test data is made noisy, while the above reference GMIA vector is extracted and kept fixed from clean 300 speaker data. For the purposes of examining and establishing the noise robust advantage intrinsic to GMIA through its parameter $\lambda$, the GMIA-based channel verification experiments are conducted for $\lambda$ varying over the range of $[10^{-4}$ to $10^4]$. One such experiment (for a given $\lambda$) consists of using 100 test OV and EXT speaker data and computing 1 GMIA vector for each speaker (from the entire duration of 30 to 40 secs of that speaker, corresponding to N=300 to 400 in X of Eqn. (7)). The test database of 100 speakers thus yields 100 OV and EXT scores, from which the EER corresponding to the given $\lambda$ is obtained. For a given noise-type and SNR, EER is obtained as a function of $\lambda$ over the range $[10^{-4}$ to $10^4]$. Such an EER-vs-$\lambda$ curve is obtained for all the 6 SNRs (clean, 20 dB, 10 dB, 0 dB, −10 dB and −20 dB), for each noise-type (street, car and music).

Cepstral-Mean (CM) Based OVAD

The experimental framework for this task uses the identical test set of 100 speakers as above, while differing only in the way the reference cepstral-mean channel feature vector is derived and in how the test set scores are computed in a leave-one-out framework, in order to offer a statistically robust verification task; this is outlined below.

For a given speaker (OV or EXT), a cepstral-mean vector is computed from the entire duration of that speaker (30 to 40 seconds, yielding 300 to 400 cepstral vectors, each obtained using framesize of 200 ms and overlap of 100 ms). The cepstral vector for each frame is obtained by a DCT of the log-spectral vector.

For a given test OV speaker (among 100 test speakers), the remaining 99 OV speakers are defined as the reference channel speakers. 1 cepstral-mean vector is computed for each of these 99 speakers (from clean data), thereby providing 99 clean reference channel vectors (for that test OV speaker). One score is computed between the test cepstral-mean vector (from the entire duration of that test speaker) and the reference cepstral-mean vector (from among the 99 reference vectors) which has the highest correlation with the test cepstral-mean vector. For the given test OV speaker, the corresponding EXT speaker (the same speaker in the 100 speaker database, but now from the EXT set) is used to compute the EXT score with respect to the same OV reference channel vectors.

The above is repeated for each of the 100 test OV speakers as the test speaker (with the remaining 99 speakers forming the reference channel set), thereby yielding 100 OV and EXT scores, from which the score distribution is formed and EER determined; this corresponds to a specific noise-type and SNR. EERs are obtained for all 5 SNRs and clean cases for the 3 noise-types (street, car and music).

MFCC Based OVAD

This OVAD task differs in several respects from the above two channel verification tasks, in that it is essentially a speaker verification task and therefore has a fairly different experimental setup, though sharing the broad parameters with the above tasks to allow for a fair comparison.

The primary feature for this task is the MFCC vector computed with a framesize of 20 ms and overlap of 10 ms, constituting quasi-stationary time-scales as required to derive spectral information of speech data. This yields 100 MFCC vectors per second of speech data, and each TIMIT speaker (of duration 30-40 seconds) has about 3000 to 4000 vectors. The MFCC feature vector used here is derived with a set of 40 triangular filters applied on the log-spectra of a frame followed by DCT on the filter energy outputs to yield the cepstral-coefficients; the MFCC vector used is of dimension 36, consisting of 12 cepstral coefficients (coefficients 2 to 13, with the first energy co-efficient not used, thereby making the feature insensitive to signal energy), 12 delta and 12 delta-delta coefficients.

The verification task here is set in the leave-one-out framework (as defined for the cepstral-mean task). For a given test speaker, the remaining 99 speakers are used to define the reference OV speakers against which the test speaker MFCCs are scored. Each of these 99 speakers is represented by a VQ codebook of size 64, considered adequate from established speaker-identification tasks as described in "[20] Reynolds D A, Rose R C (1995) Robust text-independent speaker identification using Gaussian mixture speaker models. IEEE Transactions on Speech and Audio Processing 3(1):72-83."

A scoring window is defined for the test data for deriving a score with respect to the reference VQ codebooks. The scoring windows used here are 1, 2, 4, 8, 16 and 30 secs. For a specific scoring window duration, an accumulated dissimilarity (distance) score is computed for the window with respect to each of the 99 VQ codebooks. The accumulated score for a VQ codebook is the sum of the individual scores of the MFCC vectors in the window, the individual score of a vector being the distance between the vector and the nearest codevector in the VQ codebook. The final score of the test window is determined as the minimum across the 99 VQ codebooks, i.e., a window of test vectors has a single score with respect to the best scoring reference VQ codebook.

For a given test window duration, OV and EXT scores are computed over the test data duration of a speaker and score distributions formed from such scores from all test speakers in the above leave-one-out framework; an EER is obtained for each test window duration for a given noise-type and SNR. For the different noise-types and SNRs, only the test data is subjected to noise, while the reference VQ codebooks are maintained as derived from clean data.

OVAD Results Analysis

In this section, results are presented of the above three OVAD tasks (GMIA based channel verification, CM based channel verification and MFCC based speaker verification) for different noise-types and SNRs. The performance of the three verification approaches are given in terms of EER (equal-error-rate), as defined in an earlier section, in street, car, and music noises respectively for different SNRs.

OVAD for GMIA, CM and MFCC in Noisy Conditions

Figure 5A:
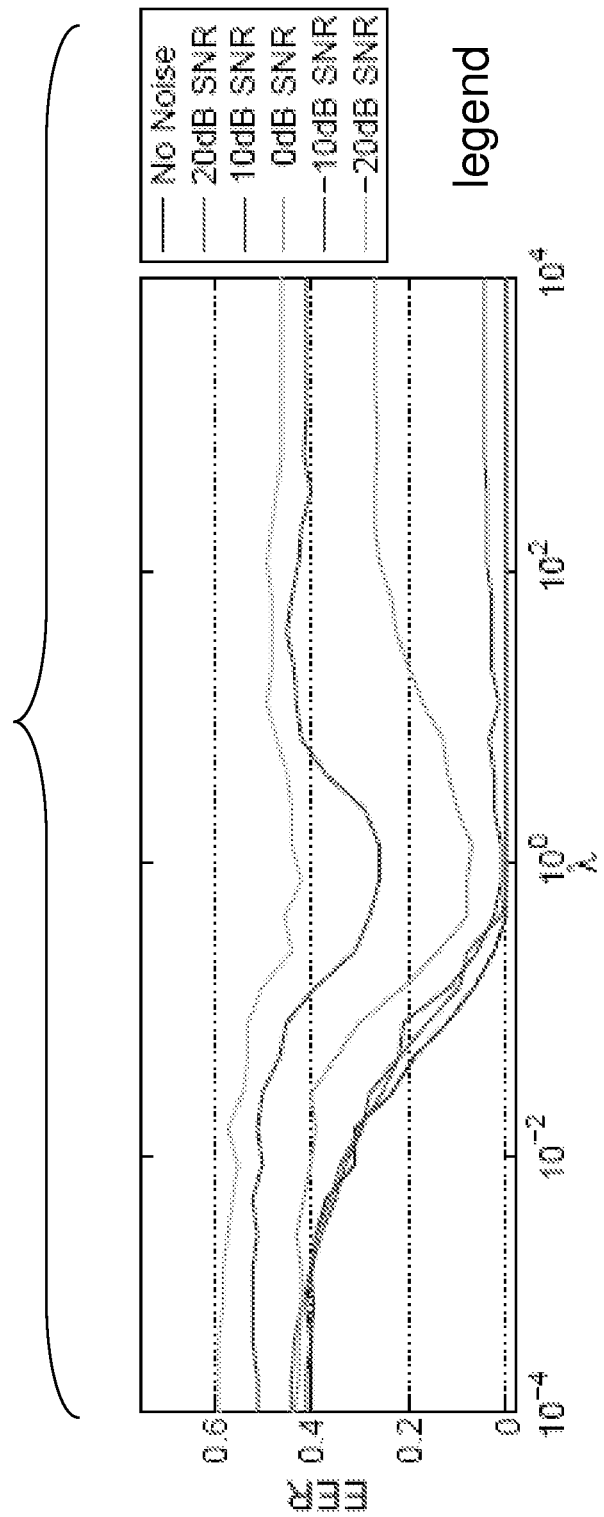
FIGS. 5A, 5B, 5C, 5D, 6A and 6B illustrate own voice activity detection in accordance with various aspects of the present invention.
Figure 5B:
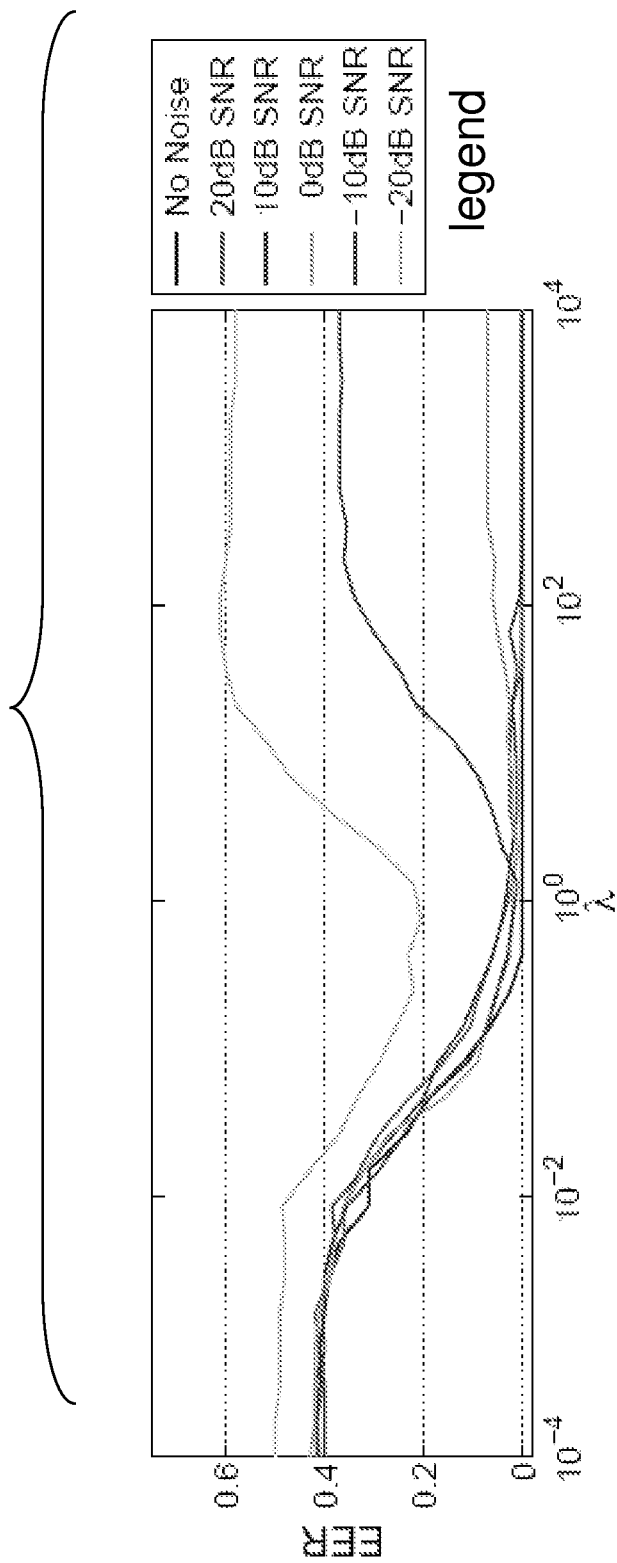
Figure 5C:
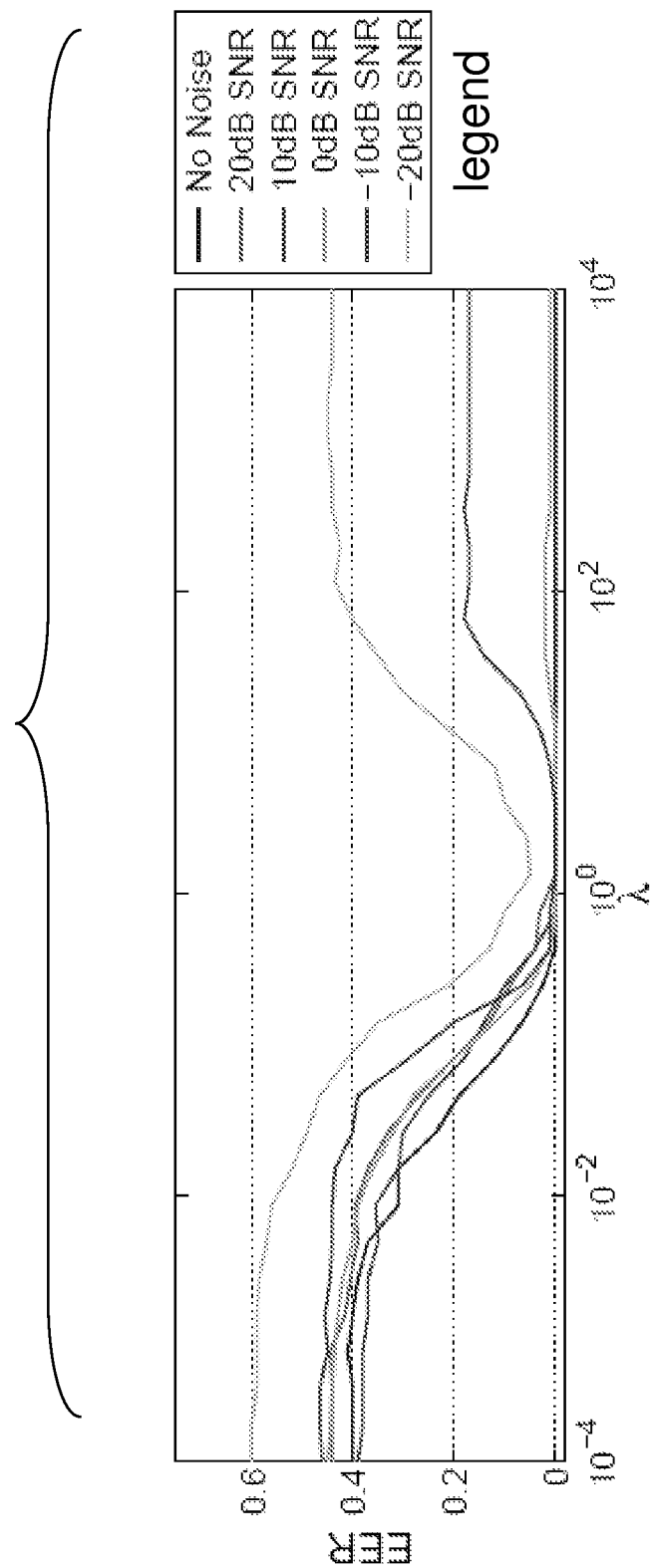

FIGS. 5A, 5B and 5C show EER as a function of $\lambda$ for GMIA. As expected, the EER shows a pronounced dependence on $\lambda$, consequently offering the best performance at $\lambda=10^0$ consistently for both clean and noisy cases. This is in agreement with the similar dependence and optimality shown by the correlation-coefficients for the experiments reported in an earlier section. Optimal results are obtained similarly for values of $\lambda=0.1\text{-}10$. This validates the importance of the parameterization of GMIA in terms of $\lambda$ to handle real world noisy data.

More specifically, it can be noted that for low SNRs and for all noise-types, the optimal $\lambda$ results in a prominent dip in EER, when compared to MIA (for $\lambda=10^{-4}$) and the spectral mean (for $\lambda=10^4$). This is in line with the basis of the channel model formulation in an above section, indicating the ability of GMIA (at optimal $\lambda$) to extract an invariant component in the presence of a higher degree of uncorrelated additive components $f_i$ (in Eqn. (12)), in this case corresponding to large variability in log-spectral components corrupted with higher levels of noise (lower SNRs).

Figure 5D:
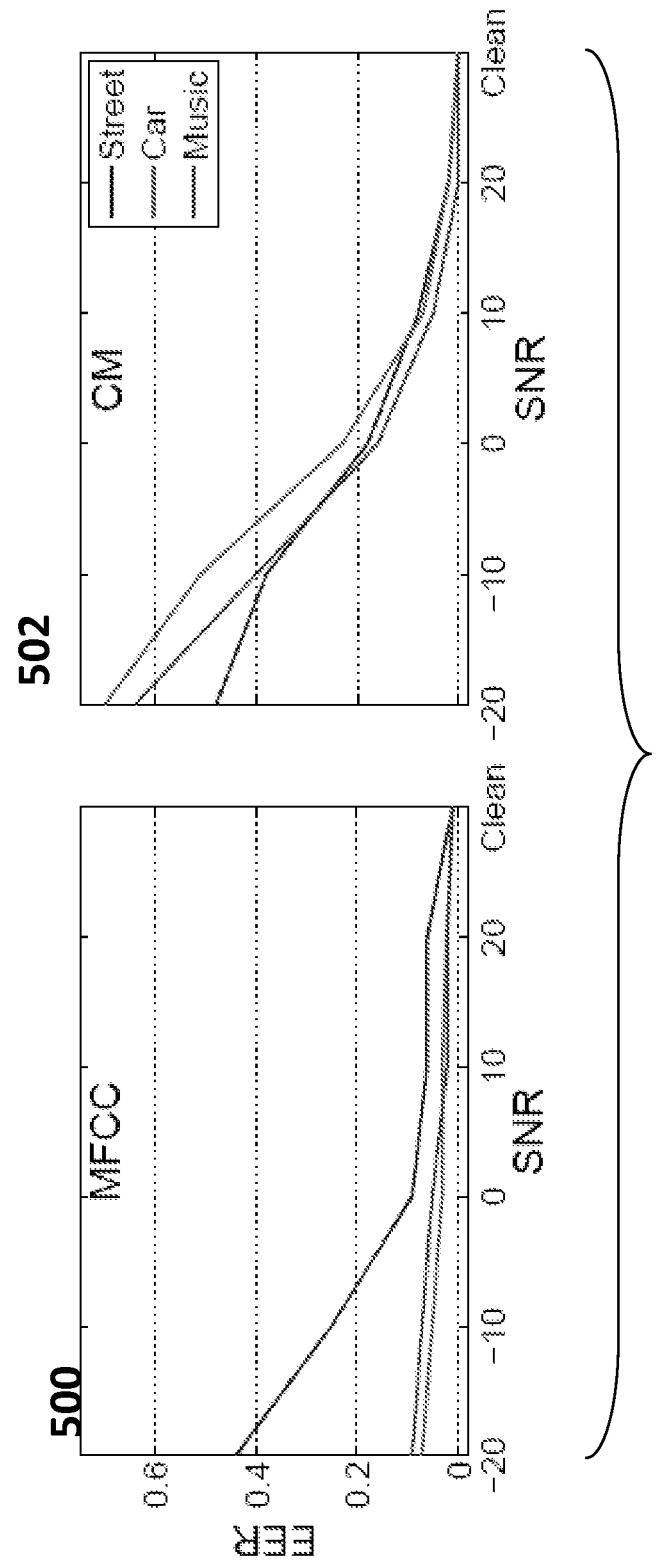

With regard to MFCCs, FIG. 5D shows that MFCC offers competitive performance to GMIA (comparable or even lower EERs at times, such as for street noise at −20 dB, −10 dB and car noise at −20 dB) for lower SNRs, while the optimal GMIA performances are better than MFCC for high SNRs. The better performance of GMIA over MFCCs (particularly for high SNR cases) is accounted for as follows. MFCC based speaker-verification approach attempts to model the OV (or EXT) space as the feature space spanned by the speech of the owner (or external) speaker (i.e., spanned by all the phonetic realizations as is unique to a speaker), and hence implicitly captures both the channel and speaker information. This in turn makes the feature space occupied by the OV and EXT speaker data to be large and diffuse, leading to potentially higher overlap of their feature spaces and a consequent higher overlap of the OV and EXT score distributions with associated higher EERs.

In contrast, the GMIA features represent the channel information directly with minimal associated speaker information (as was evident from the results in FIG. 4, where the channel model, being extracted in a speaker-independent manner, offers lower variance of the correlation coefficients) and consequently better separability between the OV and EXT spaces and associated lower EERs.

Within the channel modeling framework, the alternative cepstral-mean features (FIG. 5D), have higher EERs than the 'spectral-mean' of GMIA at $\lambda=10^4$ (i.e., the asymptotic performance for GMIA for $\lambda\to\infty$), particularly for lower SNRs. Moreover, the EERs for cepstral-mean are significantly higher than the best GMIA EERs for all noise types and SNRs. In general, while CM offers reasonably comparable performance at clean conditions, it degrades severely with increase in noise levels and has poor noise robustness. When compared to MFCC, MFCC clearly outperforms CM for all cases as illustrated in graphs 500 and 502 of FIG. 5D.

FIGS. 5A, 5B, 5C and 5D illustrate aspects of own voice activity detection with GMIA($\lambda$), MFCC and CM for various noise types and levels. In FIG. 5A it is illustrated that street noise above 0 dB SNRs enables GMIA based own voice activity detection with EERs below 10%. GMIA($10^0$) achieves best results. In FIG. 5B it is illustrated that car noise above −10 dB SNRs enables GMIA based own voice activity detection with EERs below 5%. There is a clear improvement for $\lambda=10^0$ over the spectral mean. In FIG. 5C it is illustrated that music noise is least affecting the GMIA based own voice activity detection. In FIG. 5D it is illustrated that CM performs mostly below the spectral mean and by a large margin below GMIA($10^0$). MFCC performs below GMIA($10^0$) for high SNRs and at level for low SNRs.

OVAD for GMIA, CM and MFCC for Varying Test Durations

Figure 6A:
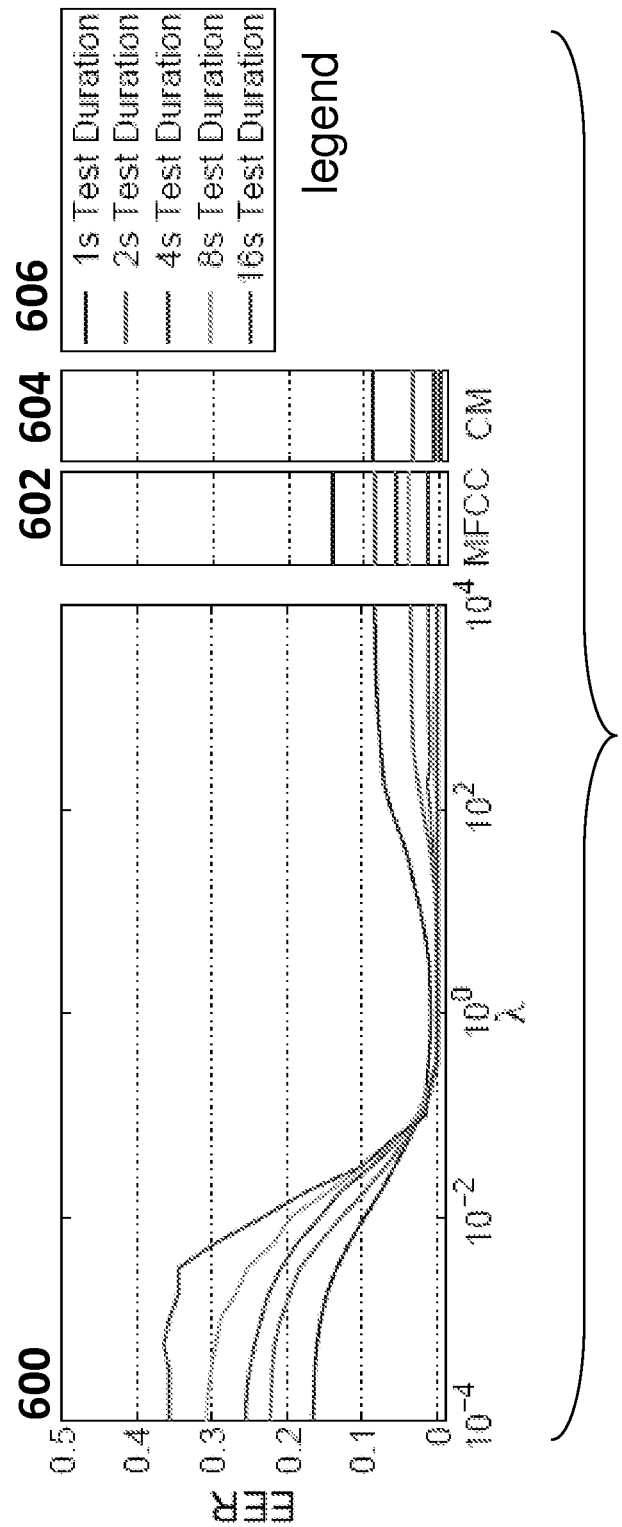
Figure 6B:
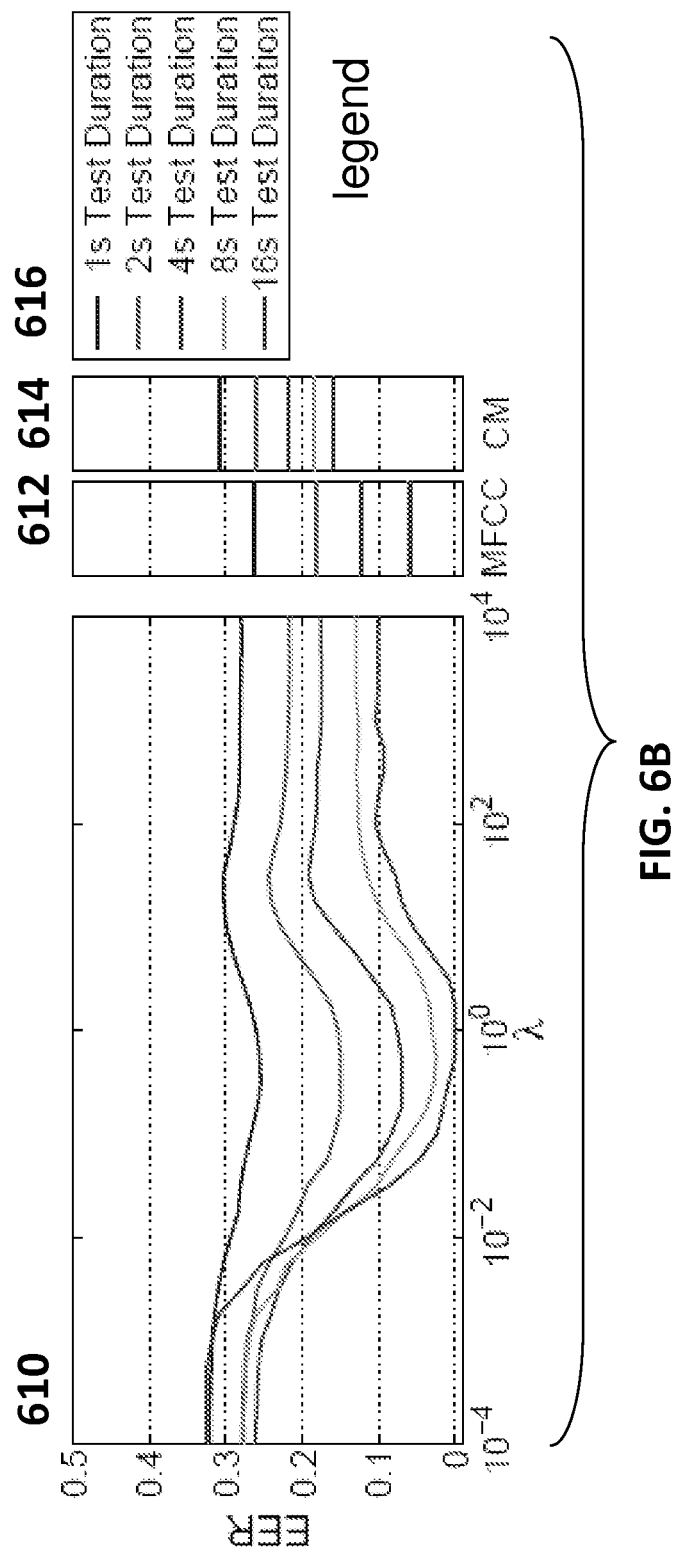

FIGS. 6A and 6B show an important computational aspect of GMIA—the duration over which a single GMIA vector is computed. In these figures, in graphs 600 and 610, EER-vs-$\lambda$ is shown for varying durations (1, 2, 4, 8 and 16 secs) over which the GMIA vector is computed in the test data. GMIA exhibits no particular sensitivity to this duration (at the optimal $\lambda$) for clean case (FIG. 6A, graph 600). Even 1 sec of data is sufficient to realize a 0% EER for the clean case at the optimal $\lambda$.

However, for the noisy case (car noise at 0 dB) in FIG. 6B, graph 610, the EER curve worsens with decrease in the duration (from 16 sec to 1 sec). For 1 sec data, even the EER at optimal $\lambda$ is as high as ~30% and it needs 4 secs of data to enable EERs ~8%. This shows that channel extraction with GMIA requires large amounts of data to enable noise robust extraction, i.e., larger data implying sufficient uncorrelated components (f in Eqn. (12)) to enable their cancellation and reliable extraction of the common channel component. This will impact online applications, where shorter durations (over which an OVAD decision is reported) will be clearly preferred.

Considering MFCC, as illustrated in FIG. 6A, graph 602 and in FIG. 6B, graph 612, GMIA($10^0$) offers better performance than MFCC for the clean case. For the noisy case (FIG. 6B, graph 610), GMIA($10^0$) is again better than MFCC for longer durations, but comparable for shorter durations. The dependence of MFCC on longer durations, is consistent with previously reported results on MFCC based speaker verification where it is known that test durations of the order of 5-10 secs are necessary to achieve optimal performance as described in "[20] Reynolds D A, Rose R C (1995) Robust text-independent speaker identification using Gaussian mixture speaker models. IEEE Transactions on Speech and Audio Processing 3(1):72-83." This is primarily due to the fact that such speaker verification relies on having long acoustic signature of the speaker to yield a sufficiently discriminating accumulated score.

Considering CM, for clean cases, as illustrated in FIG. 6A, graph 604, CM has comparable performance to the spectral mean (GMIA($10^4$)). However, for the noisy case, as illustrated in FIG. 6B, graph 614, CM is worse than MFCC and also the spectral-mean (GMIA($10^4$)), indicating that CM is more sensitive to noise than GMIA, though it can offer comparable performance to the spectral-mean for clean conditions.

FIGS. 6A and 6B illustrate own voice activity detection with GMIA($\lambda$) and MFCC for various test durations. In FIG. 6A it is illustrated that GMIA($10^0$) and the spectral mean both outperform the MFCC in case of no noise. IN FIG. 6B it is illustrated that GMIA($10^0$) outperforms MFCC for car noise with long test durations and achieves similar results for short test durations. MFCC performs better then the spectral mean. FIG. 6A, box 606 and FIG. 6B box 616 provide the legends for the different graphs.

Figure 7:
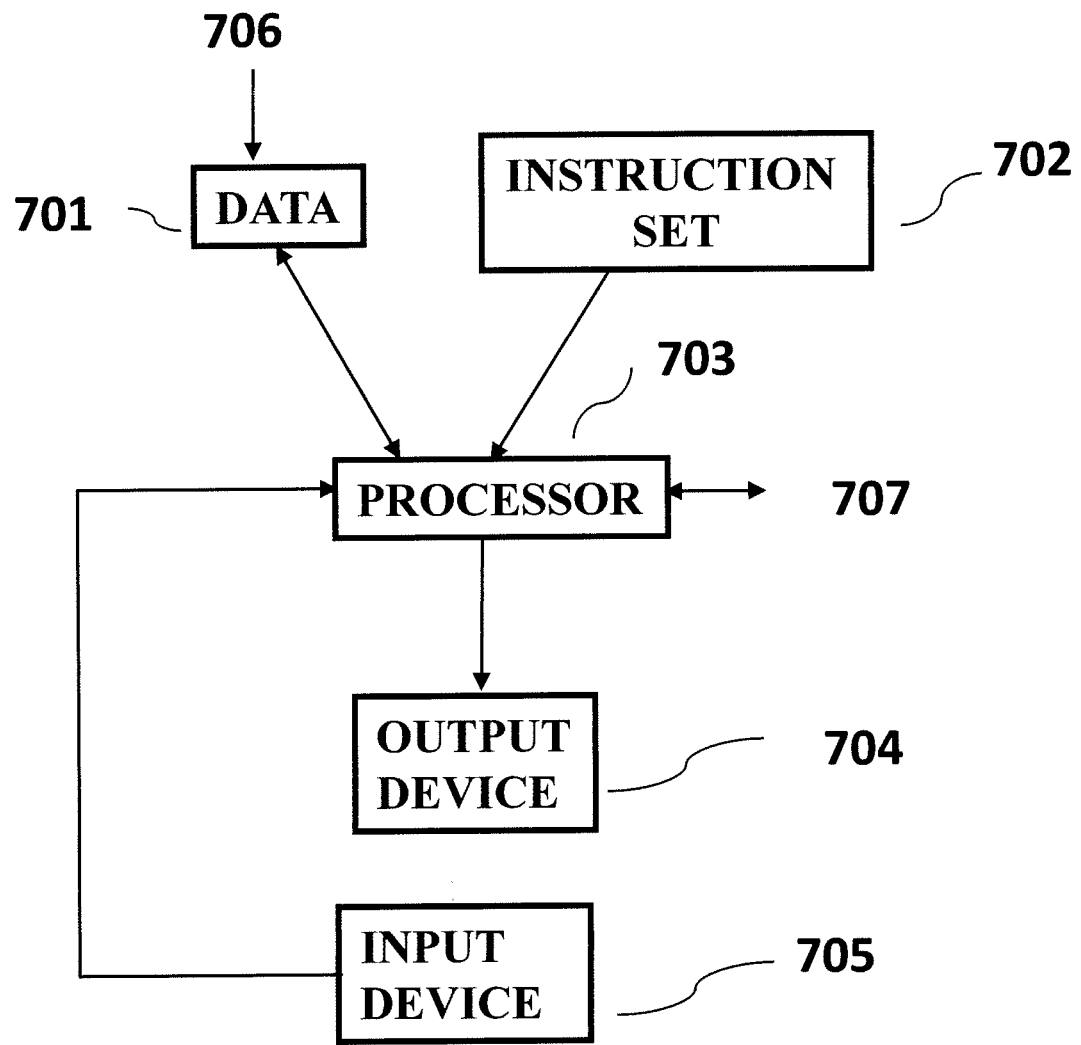
FIG. 7 illustrates a processor based system or computer enabled to execute instructions to perform the GMIA methods provided in accordance with various aspects of the present invention.

The methods as provided herein are, in one embodiment of the present invention, implemented on a system or a computer device. Thus, steps described herein are implemented on a processor in a system, as shown in FIG. 7. A system illustrated in FIG. 7 and as provided herein is enabled for receiving, processing and generating data. The system is provided with data that can be stored on a memory 701. Data may be obtained from a microphone for instance by applying an A/D converter. Data may be provided on an input 706. Such data may be acoustic data or any other data that is helpful in a voice or acoustic system. The processor is also provided or programmed with an instruction set or program executing the methods of the present invention that is stored on a memory 702 and is provided to the processor 703, which executes the instructions of 702 to process the data from 701. Data, such as processed acoustic data or any other data provided by the processor can be outputted on an output device 704, which may be an acoustical device or a display to display images or data or a data storage device. The processor also has a communication channel 707 to receive external data from a communication device and to transmit data to an external device. The system in one embodiment of the present invention has an input device 705, which may include a keyboard, a mouse, a pointing device, one or more microphones or any other device that can generate data to be provided to processor 703.

The processor can be dedicated or application specific hardware or circuitry. However, the processor can also be a general CPU or any other computing device that can execute the instructions of 702. Accordingly, the system as illustrated in FIG. 7 provides a system for processing data resulting from a sensor, a microphone or any other data source and is enabled to execute the steps of the methods as provided herein as one or more aspects of the present invention.

In accordance with one or more aspects of the present invention a novel approach for own voice activity detection by applying General Mutual Interdependence Analysis (GMIA) with a processor based system such as a computer or a processor in a hearing device such as a single integrated hearing aid has been provided. Steps of various methods according to the novel approach have been implemented on a processor based system.

Thus, novel systems and methods and steps implementing the methods have been described and provided herein for application of GMIA in own voice activity processing and in acoustic signal processing.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Generalized mutual interdependence analysis (GMIA) is a low complexity second order statistical method for projecting data in a subspace that captures invariant properties of the data. The theory behind GMIA has been provided herein in a unitary presentation and most importantly carries the reader through a succession of increasingly difficult application examples. The examples come from a conspicuous albeit well-studied signal processing problem: voice (signal) activity detection and classification. It has been shown herein how real-world conversational speech data should be modeled to fit the GMIA assumptions. From there, low complexity GMIA computations can induce reliable features that are used for classification under noisy conditions and operate with small amounts of data.

GMIA features perform better than cepstral power and mel frequency cepstral coefficient features, particularly in noisy conditions, and are amenable to online (real-time) detection algorithms. More significantly, the approach opens the door for a large number of possible applications where a signal source (e.g. a speaker), characterized by a slow varying or invariant channel that is learned, can be tracked from single channel data. The GMIA approach derived and applied herein resonates with the principle of doing more with less, which can be applied in new applications in discrete time signal processing.

The methods provided herein can be implemented in different embodiments of the present invention. In one embodiment a near-field and/or a far-field component are extracted by applying a mathematical model of a near-field and/or a far-field channel to stored voice data and applying GMIA methods. The near-field and/or far-field GMIA component are then stored on a memory that can be accessed by the processor. Such a memory and processor may be of a hearing device or hearing aid or an integrated hearing aid with a microphone and a loudspeaker or other actuator that is enabled to generate acoustic signals.

The near-field and far-field GMIA component in a further embodiment of the present invention are extracted from actual voice sounds recorded by the microphone from a source with a predetermined position relative to the microphone. In a further embodiment the position of the source can be changed within a predefined zone of the microphone, for instance with a variation less than preferably less than 25% relative to the microphone and more preferably less than 10% relative to the microphone, to reflect variations in actual use of the microphone to a speaker.

Figure 8:
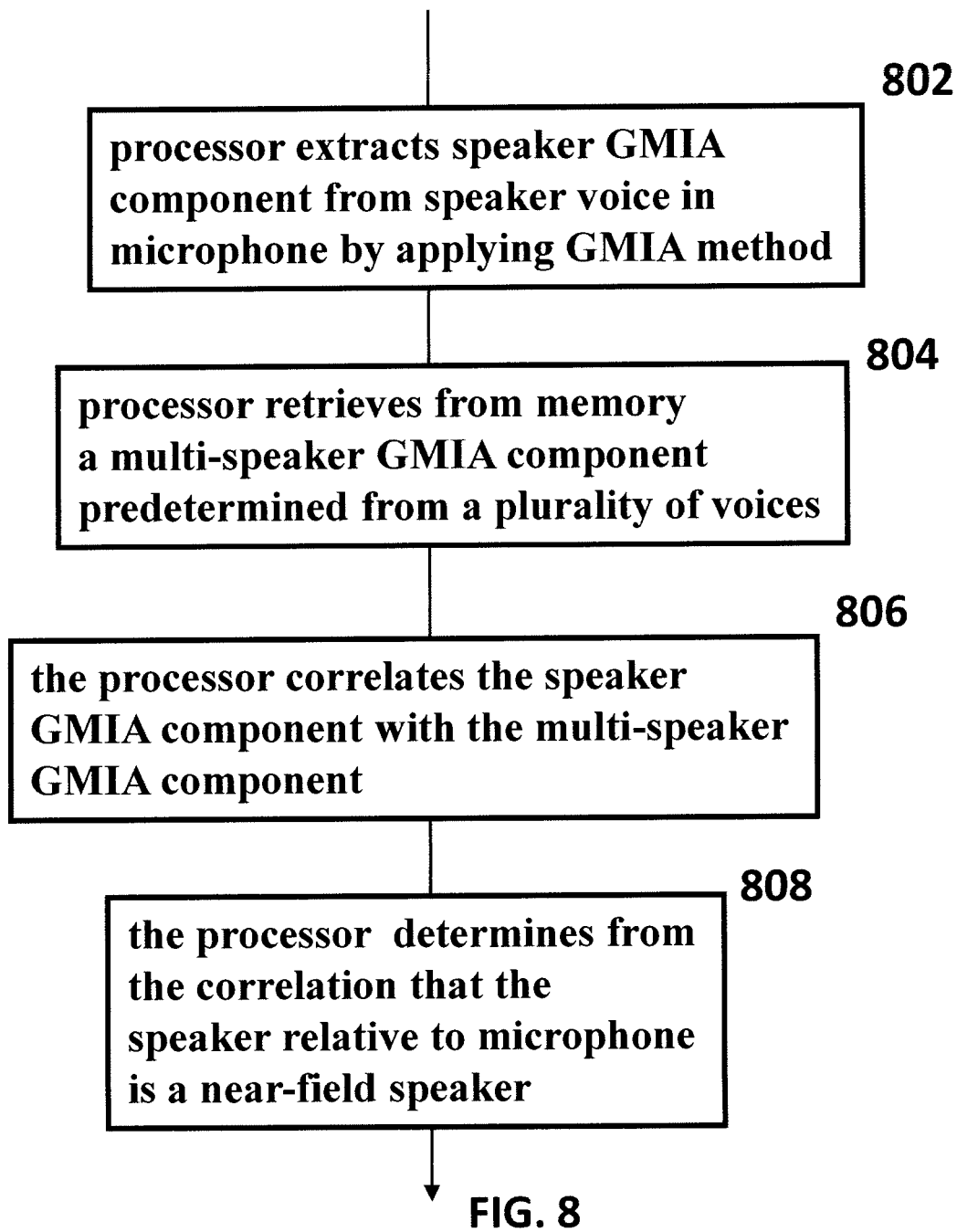
FIG. 8 illustrates steps performed in accordance with various aspects of the present invention.

One embodiment of the present invention is illustrated in FIG. 8. The processor in step 802 determines the GMIA component from a speaker's voice received by the microphone by applying a GMIA method described herein. In step 804 the processor retrieves at least the predetermined near-field GMIA component that is stored on a memory. In step 806 the processor correlates the GMIA component or a normalized GMIA component of the speaker with the stored near-field GMIA component or a normalized near-field GMIA component. In step 808 the processor determines based on the correlation if the speaker applied a near-field channel and thus the speaker can be considered an own speaker.

The steps of the general mutual interdependence analysis are performed by a processor that is part of a system. A processor processes data that relate to signal generated by a microphone. A microphone is a sensor that converts a sound into a signal, for instance an electrical signal. A converter such as an Analog/Digital (A/D) converter converts the signal, such as an electrical signal, in digitized samples, wherein a digitized sample may be a plurality of binary signals, also known as a word, a data word or data. Accordingly, the processor can process signals representing a sound as data.

U.S. patent application Ser. No. 12/614,625 filed on Nov. 9, 2009 is incorporated herein by reference in its entirety.

The following references provide background information generally related to the present invention and are hereby incorporated by reference: [[1] Benesty J, Sondhi M M, Huang (2008) Handbook of Speech Processing. Springer; [2] Bimbot F, Bonastre J F, Fredouille C, Gravier G, Magrin-Chagnolleau I, Meignier S, Merlin T, Ortega-Garcia J, Petrovska-Delacretaz D, Reynolds D A (2004) A tutorial on text-independent speaker verification. EURASIP Journal on Applied Signal Processing 4:430-451; [3] Cho Y, Al-Naimi K, Kondoz A (2001) Improved voice activity detection based on a smoothed statistical likelihood ratio. In: International Conference on Acoustics, Speech and Signal Processing, IEEE, Los Alamitos, Calif., vol 2, pp 737-740; [4] Claussen H, Rosca J, Damper R (2007) Mutual interdependence analysis. In: Independent Component Analysis and Blind Signal Separation, Springer-Verlag, Heidelberg, Germany, pp 446-453; [5] Claussen H, Rosca J, Damper R (2008) Mutual features for robust identification and verification. In: International Conference on Acoustics, Speech and Signal Processing, Las Vegas, Nev., pp 1849-1852; [6] Claussen H, Rosca J, Damper R (2009) Generalized mutual interdependence analysis. In: International Conference on Acoustics, Speech and Signal Processing, Taipei, Taiwan, pp 3317-3320; [7] Claussen H, Rosca J, Damper R I (2011) Signature extraction using mutual interdependencies. Pattern Recognition 44:650-661; [8] Deng L, O'Shaughnessy D (2003) Speech Processing: A Dynamic and Optimization-Oriented Approach. Signal Processing and Communications, Marcel Dekker, Inc.; [9] ETSI (1999) Digital cellular telecommunication system (phase 2+); voice activity detector VAD for adaptive multi rate (AMR) speech traffic channels; general description. Tech. Rep. V.7.0.0, ETSI; [10] Fisher R A (1936) The use of multiple measurements in taxonomic problems. Annals of Eugenics 7:179-188; [11] Fisher W M, Doddington G R, Goudie-Marshall K M, Jankowski C, Kalyanswamy A, Basson S, Spitz J (1993) NTIMIT. CDROM; [12] Garofolo J S, Lamel L F, Fisher W M, Fiscus J G, Pallett D S, Dahlgren N L, Zue V (1993) TIMIT acoustic-phonetic continuous speech corpus. CDROM; [13] Haigh J, Mason J (1993) Robust voice activity detection using cepstral features. In: IEEE Region 10 Conference TENCON, IEEE, vol 3, pp 321-324; [14] Hotelling H (1936) Relation between two sets of variates. Biometrika 28:322-377; [15] Hoyt J D, Wechsler H (1994) Detection of human speech in structured noise. In: International Conference on Acoustics, Speech and Signal Processing, IEEE, vol 2, pp 237-240; [16] Huang X, Acero A, Hon H W (2001) Spoken Language Processing: A guide to Theory, Algorithm, and System Development. Prentice Hall; [17] Liu P, Wang Z (2004) Voice activity detection using visual information. In: International Conference on Acoustics, Speech and Signal Processing, Montreal, Canada, vol 1, pp 609-612; [18] Qu T, Xiao Z, Gong M, Huang Y, Li X, Wu X (2009) Distance-dependent head related transfer functions measured with high spatial resolution using a spark gap. IEEE Transactions on Audio, Speech and Language Processing 17(6): 1124-1132; [19] Reynolds D A, Campbell W M (2007) Text-independent speaker recognition. In: Benesty J, Sondhi M, Huang Y (eds) Handbook of Speech Processing and Communication, Springer-Verlag GMBH, pp 763-781; [20] Reynolds D A, Rose R C (1995) Robust text-independent speaker identification using Gaussian mixture speaker models. IEEE Transactions on Speech and Audio Processing 3(1):72-83; [21] Rosca J, Balan R, Fan N, Beaugeant C, Gilg V (2002) Multichannel voice detection in adverse environments. In: European Signal Processing Conference; [22] Srinivasan K, Gersho A (1993) Voice activity detection for cellular networks. In: IEEE Speech Coding Workshop, pp 85-86; [23] Tikhonov A (1943) On the stability of inverse problems. Doklady Akademii Nauk SSSR 39(5):195-198; and [24] Zhang Z, Liu Z, Sinclair M, Acero A, Deng L, Huang X, Zheng Y (2004) Multisensory microphones for robust speech detection, enhancement and recognition. In: International Conference on Acoustics, Speech and Signal Processing, IEEE, pp 781-784.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A method for detecting own voice activity by a speaker using a microphone having a near field channel with the speaker covering a distance of 30 cm or less, comprising:
   a processor extracting a near-field channel signature from signals generated from a plurality of different voices applied to the near-field channel by using general mutual interdependence analysis (GMIA), wherein the near-field channel signature is source independent;
   the microphone generating a speaker signal from a voice of the speaker;
   the processor extracting a channel signature from the speaker signal by applying GMIA;
   the processor comparing the channel signature with the near-field channel signature to determine that the near-field channel is used by the speaker.

2. The method of claim 1, wherein a signal generated by an additional source is superimposed on the speaker signal and wherein a measure of the speaker signal relative to the signal generated by the additional source is a signal to noise ratio of 20 decibel (dB) or less.

3. The method of claim 1, further comprising:
   the processor extracting a far-field channel signature from signals generated from a plurality of different voices applied to a far-field channel covering a distance of more than 30 cm between a voice and the microphone by using general mutual interdependence analysis; and
   the processor determining that the speaker voice was transmitted over the far-field channel.

4. The method of claim 1, wherein the near-field channel signature depends on a regularization parameter and is determined by an expression:

$$GMIA(\lambda) = \zeta X \cdot (X^T \cdot X + \lambda I)^{-1} \cdot \underline{1} \text{ with,}$$

$\lambda$ the regularization parameter with $\lambda \in [0, \infty)$,
X is a set of N input vectors of dimension D, wherein N≤D,
T indicates a matrix transposition,
· indicates a matrix multiplication,
$\zeta$ is a constant,
I is an identity matrix, and
$\underline{1}$ is a vector of 1 s.

5. The method of claim 4, wherein $\lambda$ is selected based on an equal error ratio (EER).

6. The method of claim 1, wherein the method is used in an integrated hearing aid.

7. A system to determine own voice activity of a speaker using a microphone, comprising:
   a memory to store data and instructions, including a near-field channel signature extracted from a plurality of different voices applied individually to a near-field channel related to the microphone by using general mutual interdependence analysis (GMIA), the near-field channel covering a distance of 30 cm or less between the microphone and the speaker, wherein the near-field channel signature is source independent;
   a processor enabled to execute instructions to perform the steps:
      retrieving the near-field channel signature from the memory;
      receiving data representing signals generated by the microphone from a voice of the speaker;
      extracting a channel signature from the data representing the voice of the speaker by applying GMIA; and
      comparing the channel signature extracted from the data representing the voice of the speaker with the near-field channel signature to determine that the near-field channel is used by the speaker.

8. The system of claim 7, wherein a signal generated by an additional source is superimposed on the speaker signal and wherein a measure of the speaker signal relative to the signal generated by the additional source is a signal to noise ratio of 20 decibel (dB) or less.

9. The system of claim 7, wherein the system is part of an integrated hearing aid.

10. The system of claim 7, wherein the near-field channel signature depends on a regularization parameter and is determined by an expression:

$$GMIA(\lambda) = \zeta X \cdot (X^T \cdot X + \lambda I)^{-1} \cdot \underline{1} \text{ with,}$$

$\lambda$ a regularization parameter with $\lambda \in [0,\infty)$,
X is a set of N input vectors of dimension D, wherein N≤D,
T indicates a matrix transposition,
· indicates a matrix multiplication,
$\zeta$ is a constant,
I is an identity matrix, and
$\underline{1}$ is a vector of 1 s.

11. The system of claim 10, wherein $\lambda$ is selected based on an equal error ratio (EER).

12. The system of claim 7, further comprising:
the processor enabled to perform the steps:
extracting a far-field channel signature from signals generated from a plurality of different voices applied to a far-field channel covering a distance of more than 30 cm between a voice and the microphone by using general mutual interdependence analysis; and
the processor determining that the speaker voice was transmitted over the far-field channel.

13. A method for detecting own voice activity by a speaker using a microphone having a near field channel with the speaker covering a distance of 30 cm or less, comprising:
a processor extracting a speaker invariant near-field channel signature from signals generated from a plurality of different voices applied to the near-field channel;
the microphone generating a speaker signal from a voice of the speaker;
the processor extracting a channel signature from the speaker signal; and
the processor comparing the channel signature with the near-field channel signature to determine that the near-field channel is used by the speaker.

14. The method of claim 13, wherein the speaker invariant near-field channel signature is determined by general mutual interdependence analysis.

15. The method of claim 13, wherein the speaker invariant near-field channel signature is determined by mel frequency cepstral coefficients analysis.

16. The method of claim 13, wherein the speaker invariant near-field channel signature is determined by cepstral-mean analysis.

* * * * *